(12) United States Patent
Tsai et al.

(10) Patent No.: US 8,511,200 B2
(45) Date of Patent: Aug. 20, 2013

(54) SPEED CONTROL DEVICE FOR BICYCLE

(75) Inventors: Wen-Feng Tsai, Wufeng Shiang (TW); Chia-Wei Liao, Wufeng Shiang (TW)

(73) Assignee: Tien Hsin Industries Co., Ltd., Taichung County (TW)

( * ) Notice: Subject to any disclaimer, the term of this patent is extended or adjusted under 35 U.S.C. 154(b) by 794 days.

(21) Appl. No.: 12/633,921

(22) Filed: Dec. 9, 2009

(65) Prior Publication Data

US 2011/0132123 A1 Jun. 9, 2011

(51) Int. Cl.
*B62K 23/06* (2006.01)
*B62M 25/04* (2006.01)

(52) U.S. Cl.
CPC ............... *B62K 23/06* (2013.01); *B62M 25/04* (2013.01)
USPC .............................. 74/502.2; 74/488; 74/489

(58) Field of Classification Search
USPC ............................ 74/502.2, 488, 489, 473.14
IPC ...................................................... B62M 25/04
See application file for complete search history.

(56) References Cited

U.S. PATENT DOCUMENTS

| | | | |
|---|---|---|---|
| 5,213,005 A | 5/1993 | Nagano | 74/502.2 |
| 5,241,878 A * | 9/1993 | Nagano | 74/502.2 |
| 5,287,766 A | 2/1994 | Nagano | 74/502.2 |
| 5,361,645 A | 11/1994 | Feng et al. | 74/502.2 |
| 5,479,776 A | 1/1996 | Romano | 74/502.2 |
| 6,220,111 B1 | 4/2001 | Chen | 74/473.15 |
| 7,100,471 B2 * | 9/2006 | Irie et al. | 74/502.2 |
| 2008/0295638 A1 * | 12/2008 | Miki et al. | 74/502.2 |
| 2009/0031846 A1 * | 2/2009 | Dal Pra' et al. | 74/502.2 |
| 2012/0234125 A1 * | 9/2012 | Liao | 74/473.14 |
| 2012/0318094 A1 * | 12/2012 | Fukao et al. | 74/502.2 |

FOREIGN PATENT DOCUMENTS

WO PCT/IT2006/000037 * 7/2007

* cited by examiner

*Primary Examiner* — Vinh Luong
(74) *Attorney, Agent, or Firm* — Alan Kamrath; Kamrath IP Lawfirm, P.A.

(57) ABSTRACT

A speed control device which is adapted to be used in connection with a derailleur type bicycle has one operation mode for up-shifting the speed and another operation mode for down-shifting the speed. The two operation modes can be affected by an operation lever, with the operation lever pivoted in a first plane for the up-shifting operation and in a second plane for the down-shifting operation.

15 Claims, 27 Drawing Sheets

SPEED CONTROL DEVICE FOR BICYCLE

BACKGROUND OF THE INVENTION

1. Field of the Invention

The present invention relates to a speed control device for a derailleur type bicycle and, in particular, to a speed control device including an operation lever that a user can pivot in a first direction to pull a cable that controls the derailleur and in a second direction to release the cable.

2. Description of the Related Art

U.S. Pat. Nos. 5,213,005; 5,361,645; 5,479,776 and 6,220,111 disclose a speed control device including one operation lever that the user can use to up-shift the speed and another operation lever to down-shift the speed. However, such speed control device has the disadvantage that the operator could easily operate the wrong lever in a speed change operation.

U.S. Pat. No. 5,287,766 shows a speed control device which utilizes an operation lever for up-shifting and down-shifting the speed. The speed control device is particularly mounted on straight handlebar type bicycles. In spite of the advantage of the speed control device employing one operation lever as discussed in the proceeding, it is believed that there is a need for improvement in the field of speed control devices and more specifically for use in curved handlebar type bicycles.

The present invention is, therefore, intended to obviate or at least alleviate the problems encountered in the prior art.

SUMMARY OF THE INVENTION

According to the present invention, a speed control device, which is adapted to be used in connection with a derailleur type bicycle and has one operation mode for winding the cable that controls the derailleur and another operation mode for releasing the cable, includes a control assembly including a first toothed member and a second toothed member borne on a connecting shaft. The first and second toothed members are rotatable together in first and second directions. The control assembly further includes an operation mechanism which includes a user-input pivoted in a first plane to cause the first and second toothed members to rotate in the first direction for winding the cable, and in a second plane to cause the first and second toothed members to rotate in the second direction for releasing the cable.

Other objects, advantages, and new features of the present invention will become apparent from the following detailed description of the invention when considered in conjunction with the accompanied drawings.

DETAILED DESCRIPTION OF THE PREFERRED EMBODIMENTS

Figure 1:
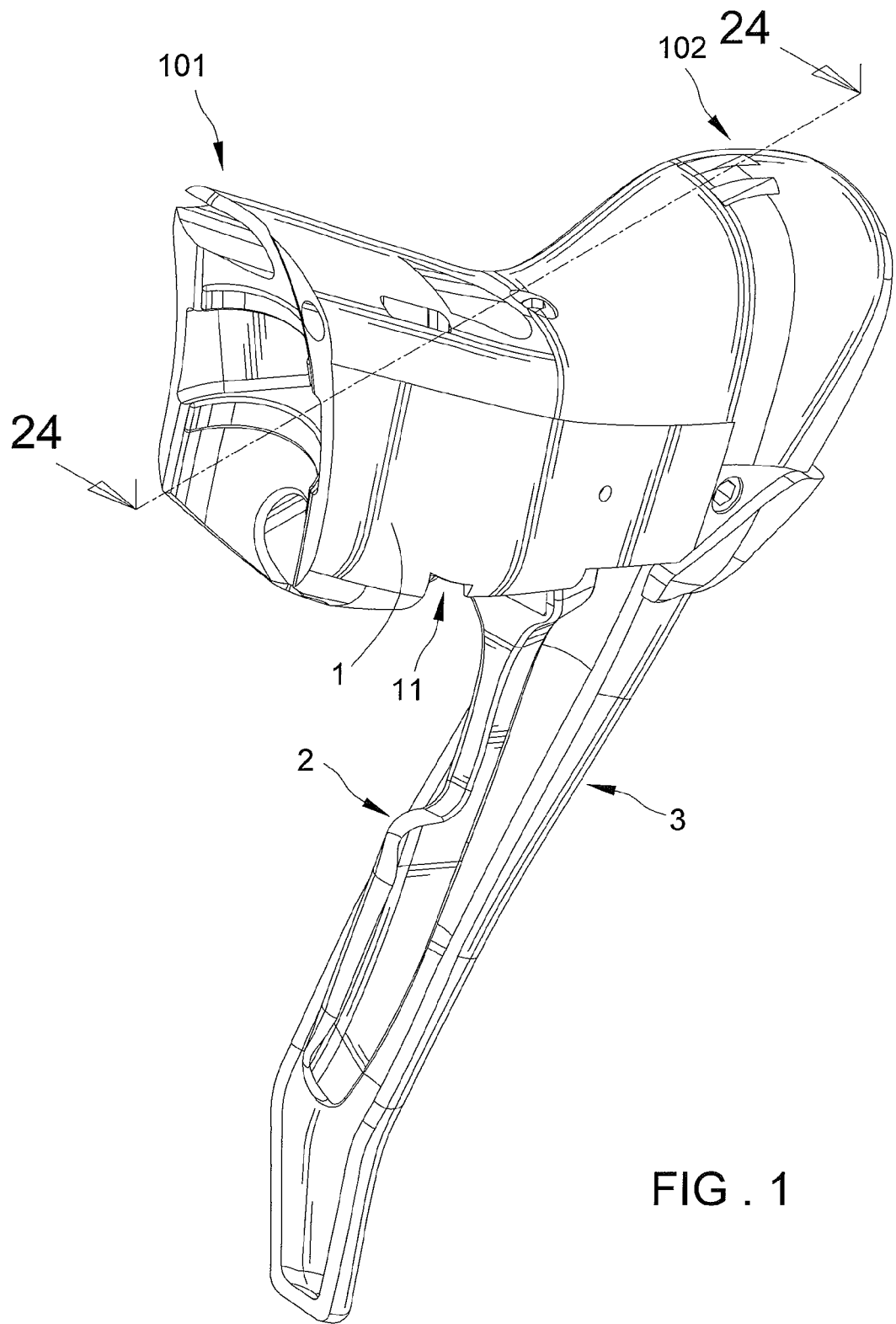
FIG. 1 is a perspective view of a speed control device in accordance with the present invention.
Figure 2:
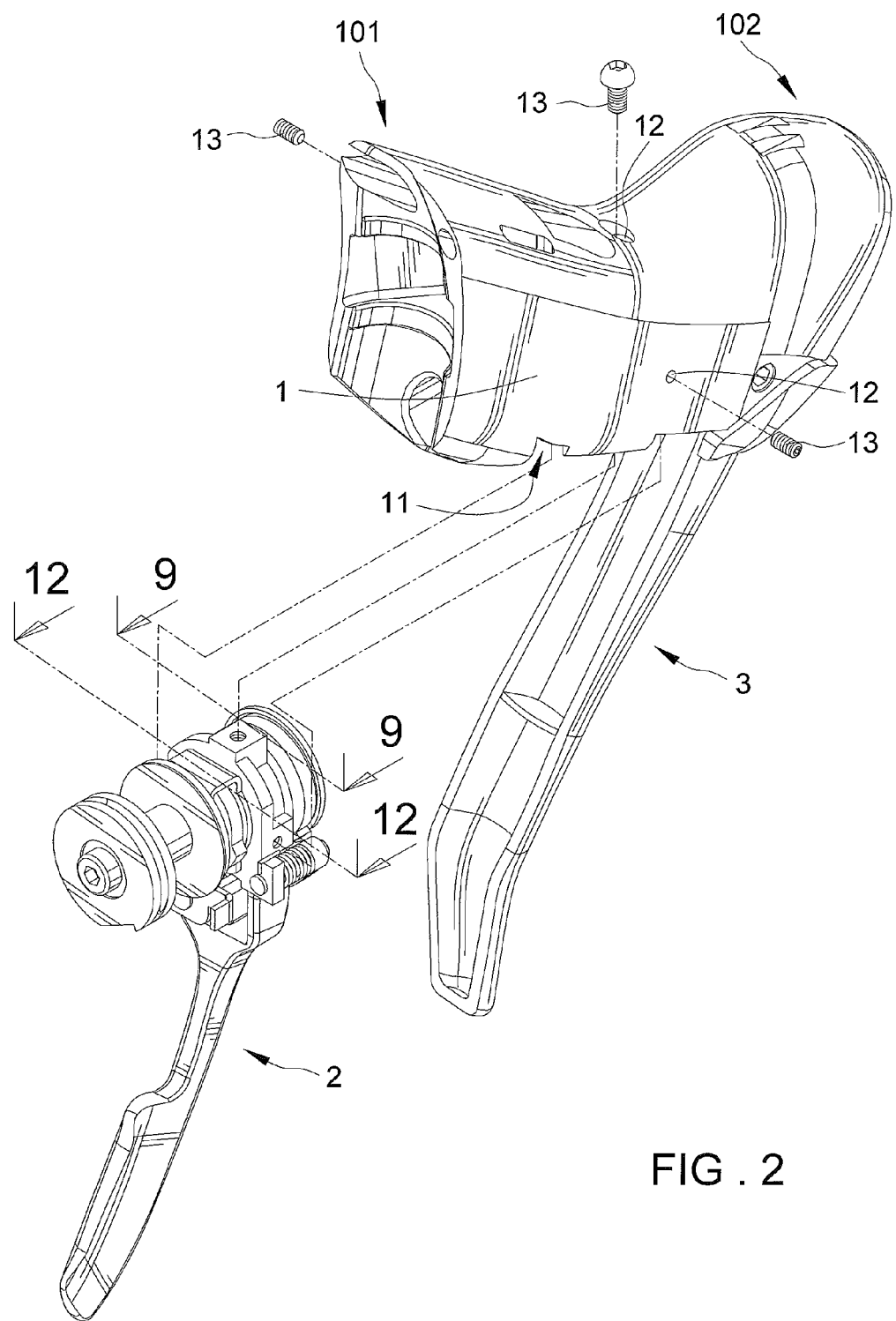
FIG. 2 is an exploded perspective view of the speed control device of FIG. 1.
Figure 3:
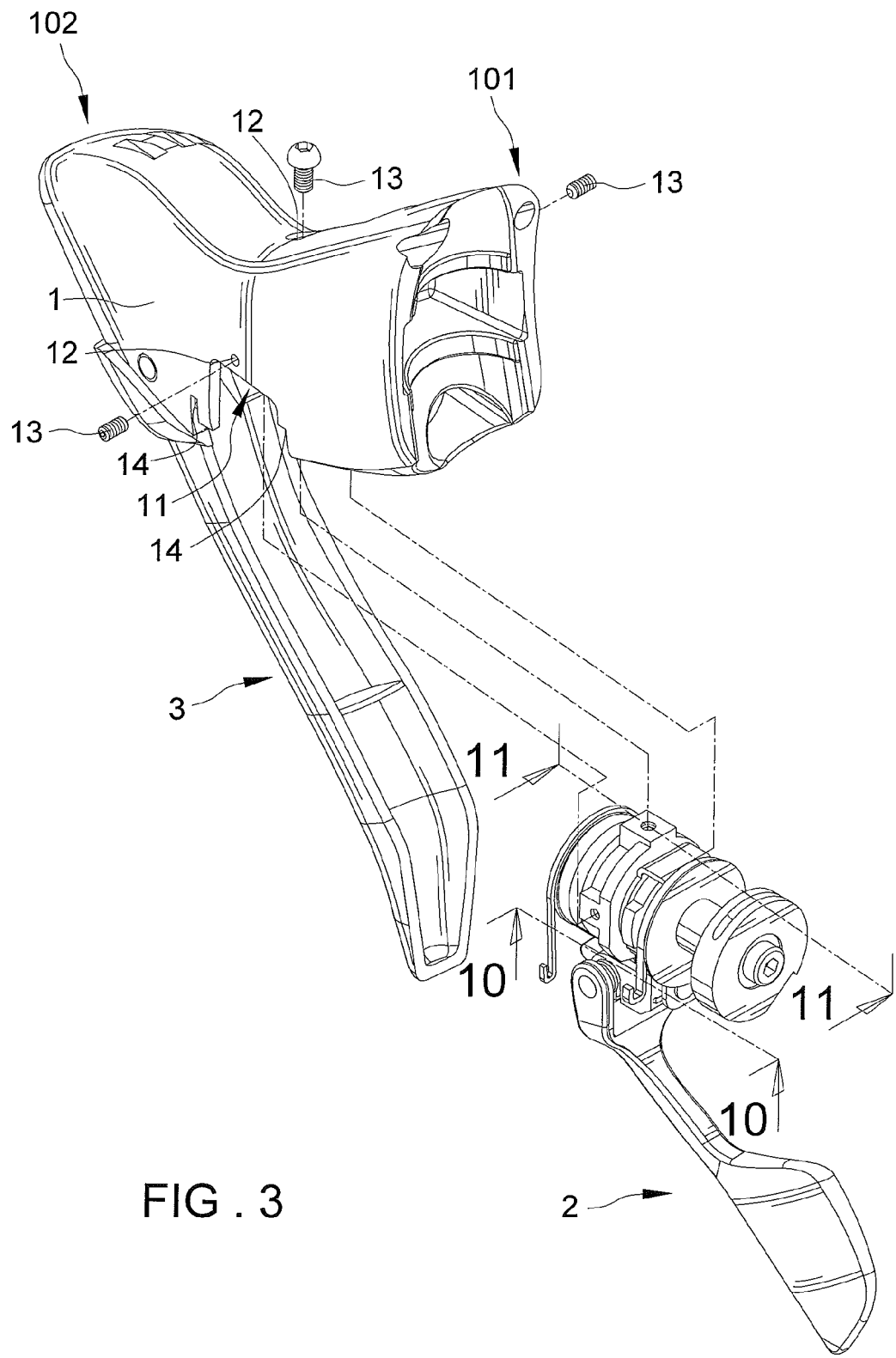
FIG. 3 is another exploded perspective view of the speed control device taken from a different angle than that of FIG. 2.
Figure 4:
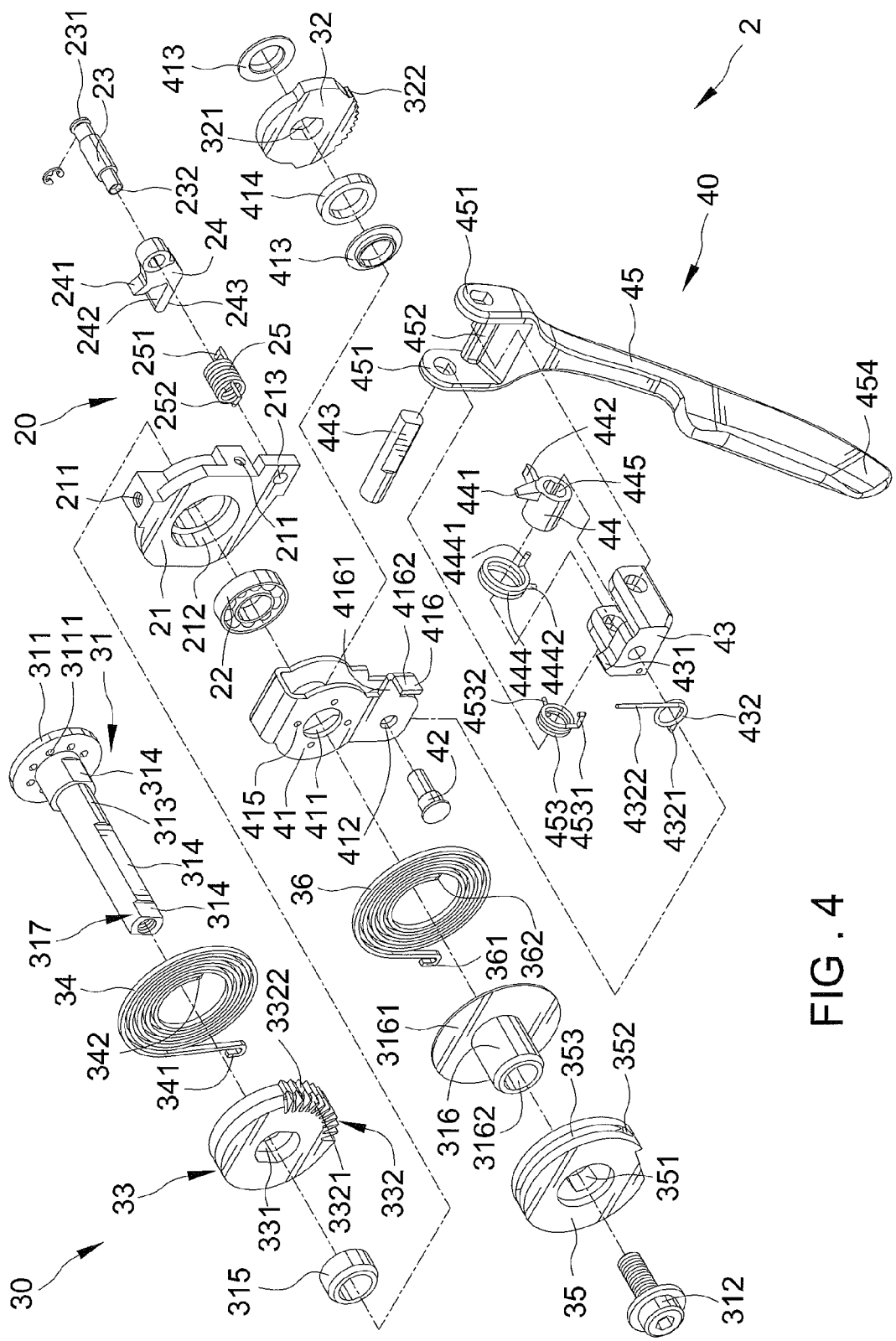
FIG. 4 is an exploded perspective view of a control assembly embodying the present invention.
Figure 5:
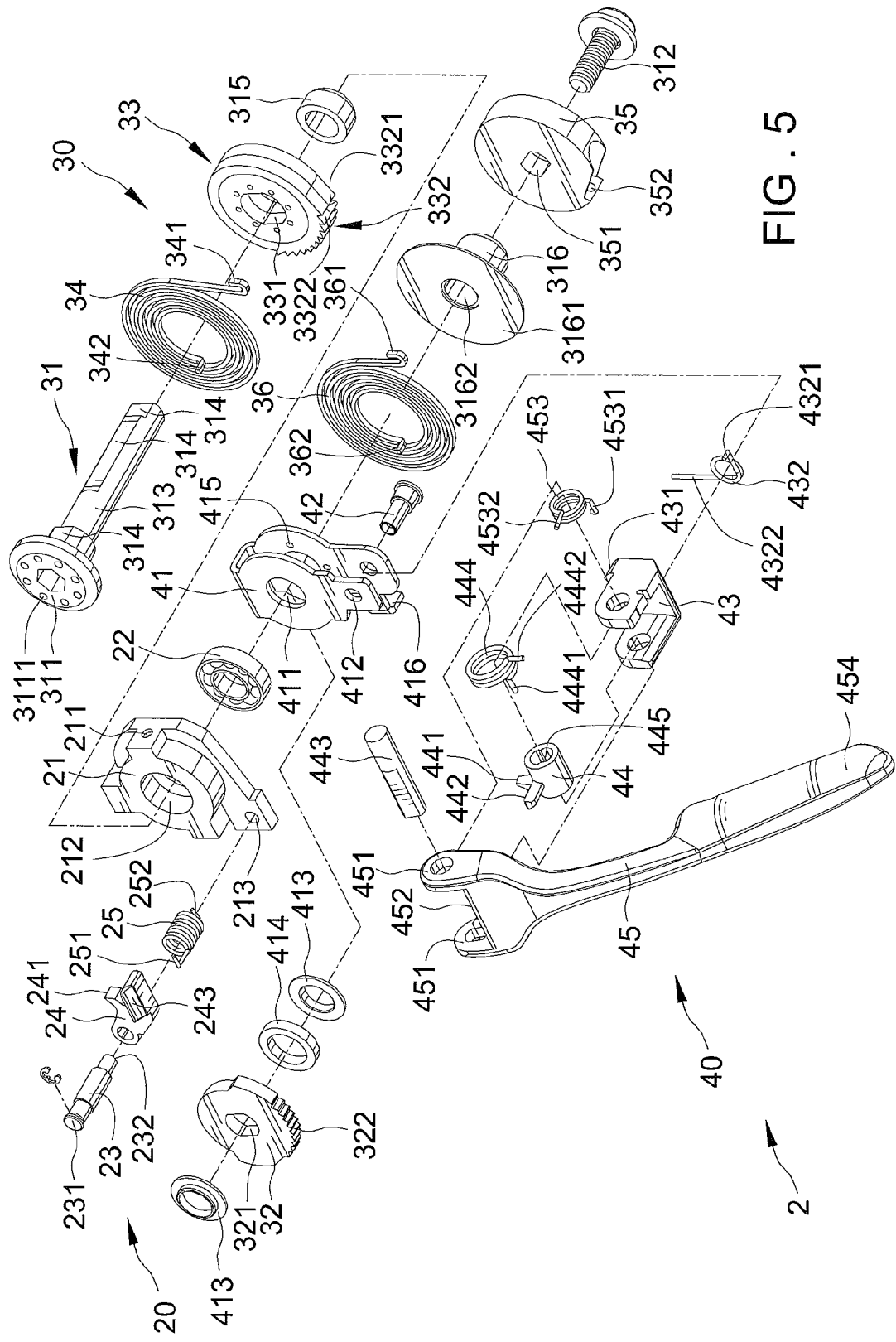
FIG. 5 is another exploded perspective view of the control assembly taken from a different angle than that of FIG. 4.
Figure 6:
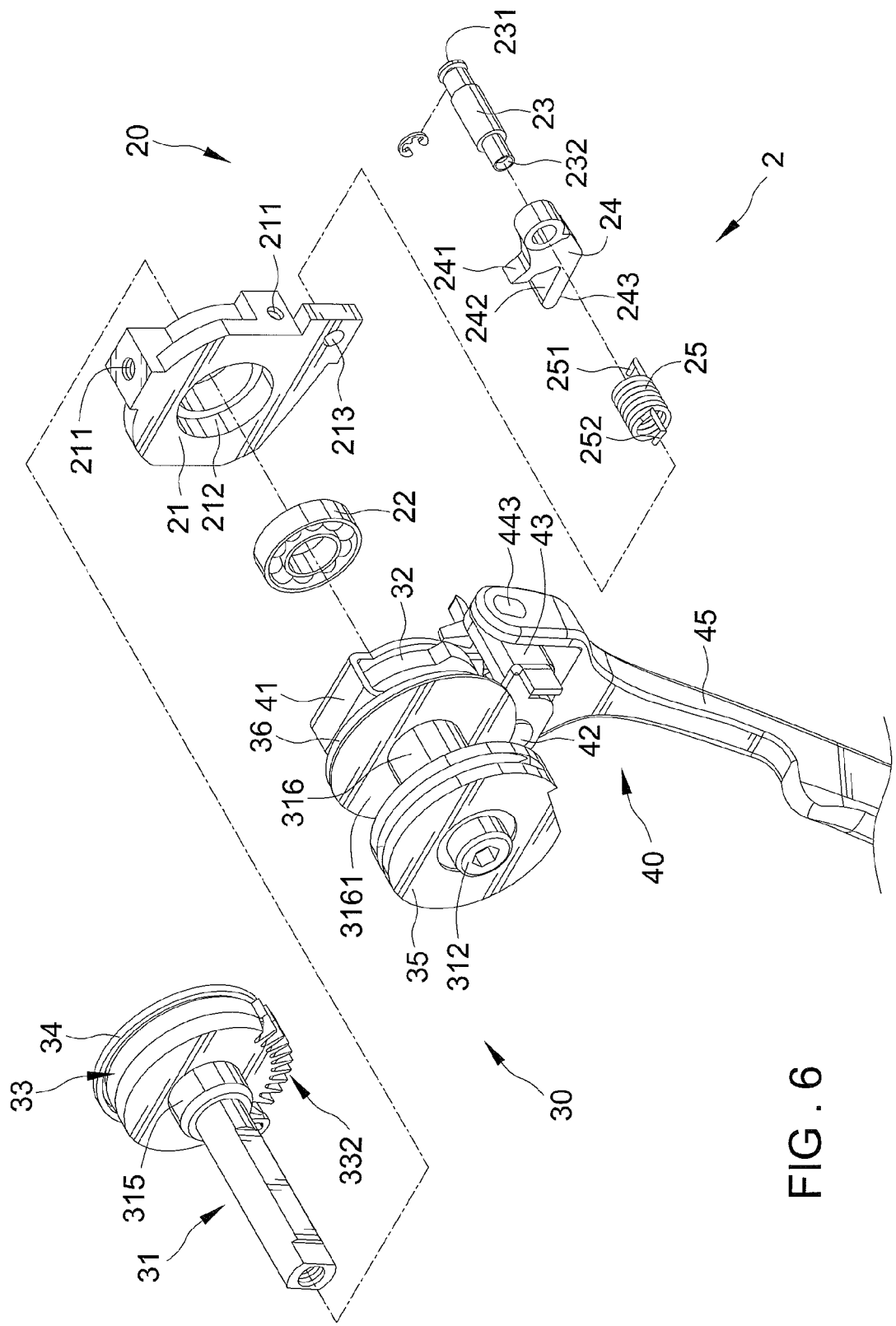
FIG. 6 is a semi-exploded view of a first engaging mechanism of the control assembly embodying the present invention.
Figure 7:
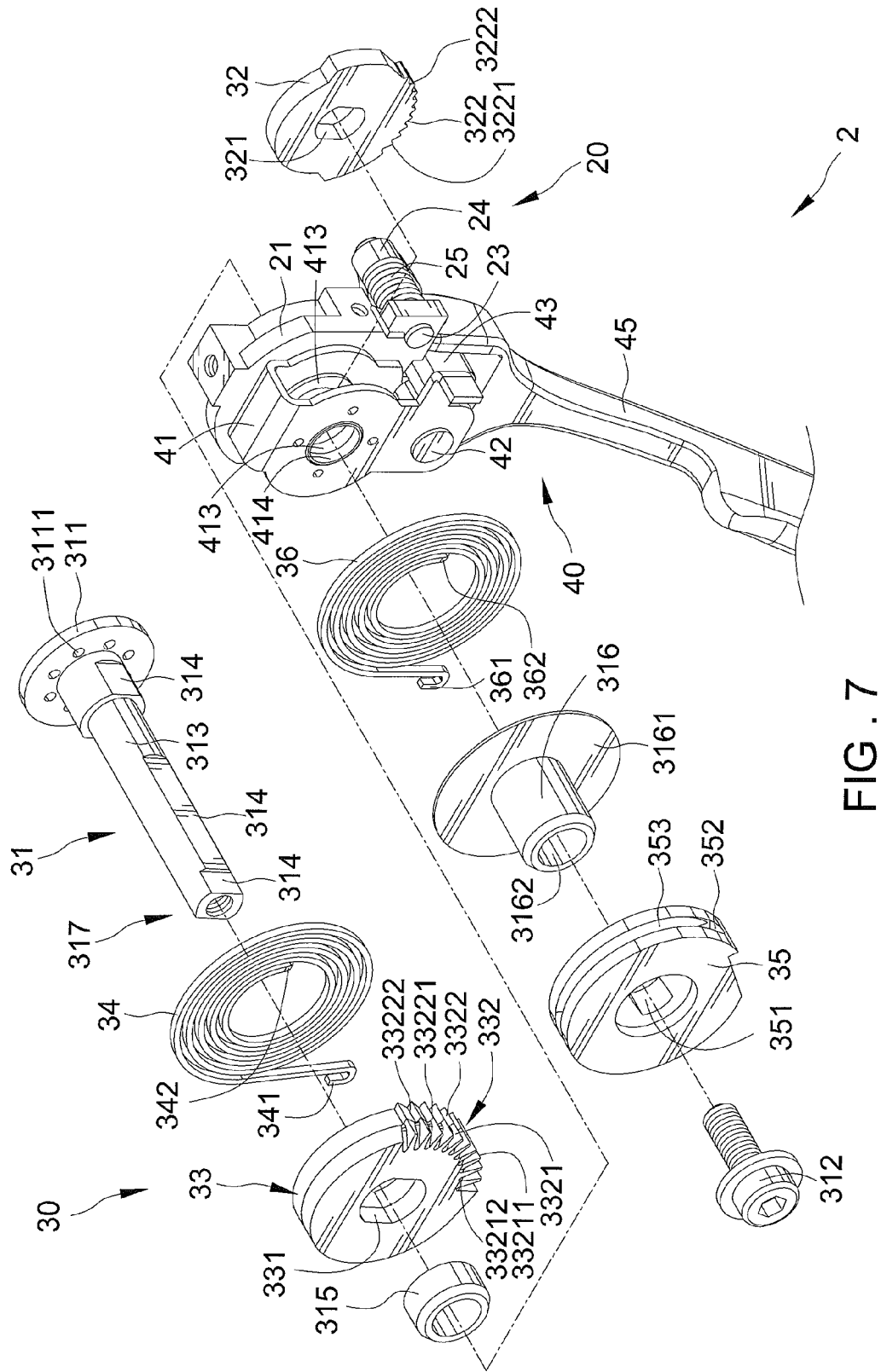
FIG. 7 is a semi-exploded view of a second engaging mechanism of the control assembly embodying the present invention.
Figure 8:
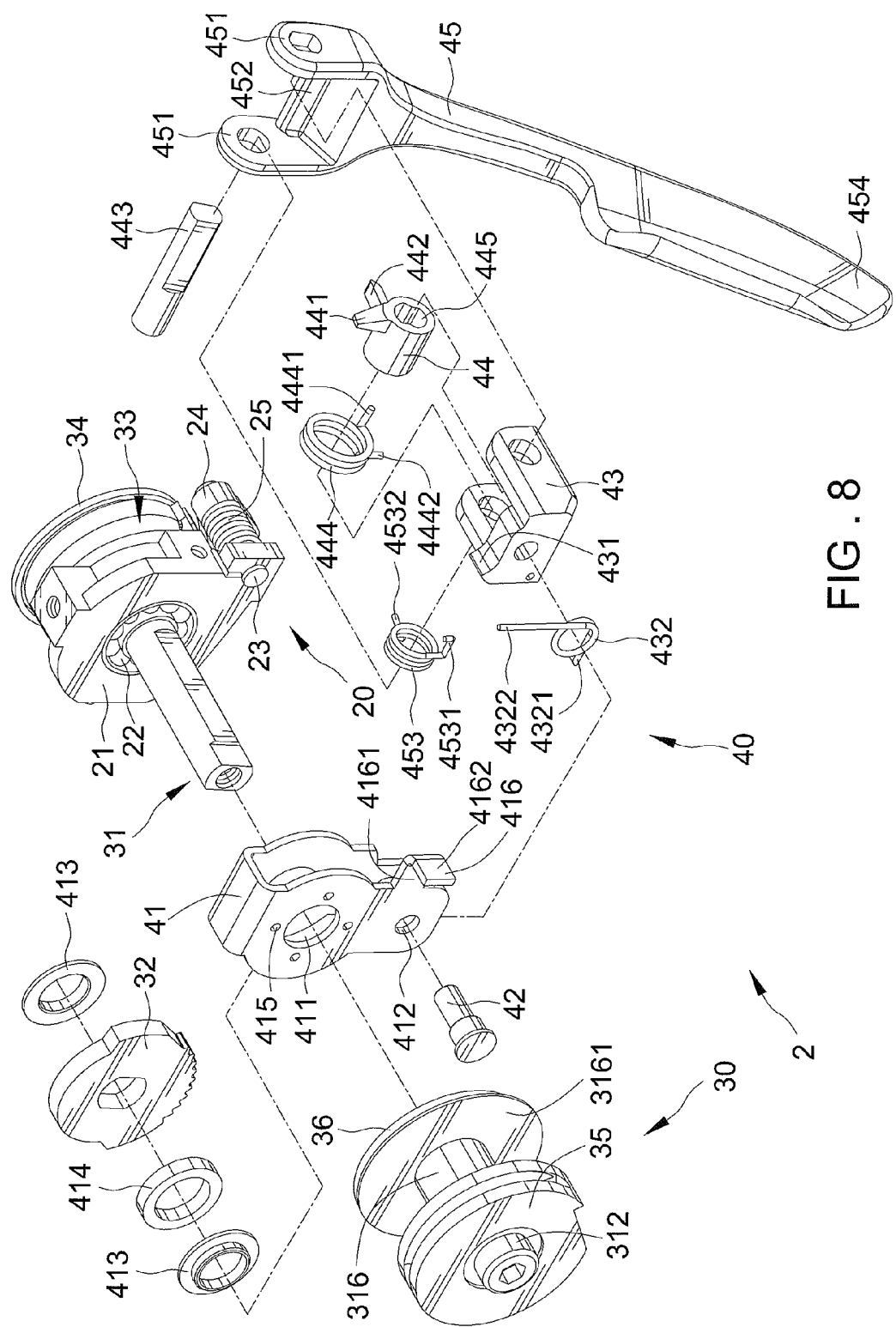
FIG. 8 is a semi-exploded view of an operation mechanism of the control assembly embodying the present invention.

Referring to the drawings, a speed control device in accordance with the present invention is adapted to be used in connection with a derailleur type bicycle. The speed control device includes a housing 1 defining a first end 101 and a second end 102 opposite to the first end 101, and one of the first and second ends 101 and 102 is adapted to connect to the bicycle. The housing 1 includes an opening 11 in which a control assembly 2 and a brake assembly 3 are pivotally received. The control assembly 2 is retained in the opening 11 via a plurality of fasteners 13, and the fasteners 13 are inserted through a plurality of apertures 12 in the housing 11 and engage in a plurality of apertures 211 in a fixing member 21 of the control assembly 2. The control assembly 2 includes a first engaging mechanism 20 and a second engaging mechanism 30 connected to the fixing member 21.

The first engaging mechanism 20 includes a pivot 23 mounted to the fixing member 21, and the fixing member 21 includes a through hole 213 receiving an end of the pivot 23. The first engaging mechanism 20 also includes a first pawl 24 inserted by and moveably mounted between proximal and distal ends 231 and 232 of the pivot 23 such that the first pawl 24 is pivotal in a first plane FP transverse to a longitudinal length of the pivot 23, i.e. the length extending from the proximal end 231 to the distal end 232 of the pivot 23. The first pawl 24 is biased by an elastic element 25. Preferably, the elastic element 25 is a torque spring and includes a plurality of coaxially disposed coiled sections inserted by the pivot 23 and a first leg 251 extending therefrom and connecting to the first pawl 24, and a second leg 252 extending therefrom and connecting to the fixing member 21. Additionally, the coiled sections have radial distances equal to one another.

The second engaging mechanism 30 includes a connecting shaft 31 inserting through a compartment 212 which extends through the fixing member 21 and is parallel to the through hole 213. The connecting shaft 31 is supported by a bearing 22. The bearing 22 is disposed in the compartment 212 and surrounds a first engaging peripheral section 313 of the connecting shaft 31. The engaging peripheral section 313 preferably has a circular cross-section. The connecting shaft 31 bears a first toothed member 32 and a second toothed member 33 on opposite sides of the fixing member 21, respectively. Additionally, the connecting shaft 31 includes a plurality of second engaging peripheral sections 314 on which the first and second toothed members 32 and 33 are mounted. Each second engaging peripheral section 314 has a non-circular cross section. Likewise, the first toothed member 32 includes a hole 321, and the second toothed member 33 includes a hole 331, respectively. The holes 321 and 331, which are inserted by the connecting shaft 31, have shapes conforming to the second engaging peripheral sections 314 where the first and second toothed members 32 and 33 are mounted. Therefore, the first and second toothed members 32 and 33 are connected rigidly and prevented from rotation with respect to a longitudinal axis of the connecting shaft 31.

The first toothed member 32 includes a toothed section 322 formed on its outer periphery and including a plurality of teeth, in which two adjacent teeth have an interconnecting edge 33212 extending in one direction and in which each tooth has a ridge 33211 extending in another direction parallel to the one direction. The second toothed member 33 includes a toothed section 332 formed on its outer periphery and including a first plurality of teeth 3321 disposed in a plane and a second plurality of teeth 3322 disposed in another plane, which may be parallel to the plane of the first plurality of teeth 3321. Additionally, two adjacent teeth of the first plurality of teeth 3321 have an interconnecting edge 33212 extending in one (first) direction 33212D, and each tooth has a ridge 33211 extending in another (second) direction 33211D, which has an angled relationship with respect to the direction of the interconnecting edge 33212. Furthermore, two adjacent teeth of the second plurality of teeth 3322 have an interconnecting edge 33222 extending in one (third) direction 33222D, and each tooth has a ridge 33221 extending in another (fourth) direction 33221D, which is parallel to the direction of the interconnecting edge 33122. Further, the second plurality of teeth 3322 are disposed adjacent to the first pawl 24, and the first pawl 24 is engagable with the interconnecting edge 33222 between any two adjacent teeth. Particularly, when the elastic element 25 is in a "rest" position, the first pawl 24 is engaged in one of the interconnecting edges 33222 by the elastic element 25. Further, the first pawl 24 includes an engaging section 241 protruding in a plane which may cross the longitudinal length of the pivot 23 and selectively receivable between two adjacent teeth of the second plurality of teeth 3322. Moreover, the second toothed member 33 is ensured to have a proper distance from the fixing member 21 by a spacer 315. The spacer 315 is disposed in the compartment 212 and surrounds the first engaging peripheral section 313 of the connecting shaft 31.

The connecting shaft 31 also includes a first stop 311 disposed on a proximal end thereof and a second stop 312 disposed on a distal end 317 thereof, respectively. The first stop 311 includes two opposing sides and a plurality of orifices 3111 extending from one side and toward the other side. The connecting shaft 31 further bears a first elastic member 34 which includes a proximal end 341 hooking to a resist edge 14 formed in the housing 1 and a distal end 342 engaging in one of the plurality of orifices 3111. So, if the connecting shaft 31 is rotated in a first direction FD such that the first elastic member 34 is tensioned, releasing the first elastic member 34 from tension would cause the connecting shaft 31 to rotate in a second direction SD, which is opposite to the first direction FD. Moreover, the connecting shaft 31 bears a spacer 316 which includes a limiting face 3161 and a tube 3162 inserted by the connecting shaft 31. A cable-receiving member 35 includes a hole 351 inserted by the connecting shaft 31 and adapted to receive a shifting cable adapted to cause speed change upon operation of the speed control device. Additionally, the cable-receiving member 35 includes a retaining section 352 on which an end of the shifting cable is secured, and a groove 353 formed on its outer periphery and provided for preventing a length of the shifting cable engaged with the outer periphery of the cable-receiving member 35 from dislodging therefrom.

In addition, the first stop 311 is provided for containing the first elastic member 34 in the connecting shaft 31.

The control assembly 2 further includes an operation mechanism 40 connected to the second engaging mechanism 30. The operation mechanism 40 includes a connecting member 41 pivotal with respect to the connecting shaft 31 and in a plane which crosses the longitudinal length of the connecting shaft 31. The connecting shaft 31 bears a second elastic member 36 which includes a proximal end 361 hooking to another resist edge 14 formed in the housing 1 and a distal end 362 hooking to the connecting member 41. The connecting member 41 includes two opposing sides spaced from each other, and one of the sides includes a plurality of orifices 415 that allow the distal end 342 of the second elastic member 36 to engage in one orifice 415. So, if the connecting member 41 is rotated in a first direction FD such that the second elastic member 36 is tensioned, releasing the second elastic member 36 from tension would cause the connecting member 41 to rotate in a second direction SD, which is opposite to the first direction FD. Additionally, one of the sides of the connecting member 41 includes a limit section 416 adapted to abut the housing 1 such that the connecting member 41 is adapted to be pivoted to an extent until it is stopped by the housing 1. In the embodiment, the limit section 416 includes a first portion 4161 extending in a plane of the side and a second portion 4162 extending from the first portion and in a plane which substantially crosses the plane of the first portion 4161. With the second portion 4162, the limit section 416 would have a substantial area to abut against the housing 1.

Further, the connecting member 41 defines a gap between the opposing sides and in which the first toothed member 32 is adapted to be received, and includes a hole 411 extending through the sides and inserted by the connecting shaft 31. Additionally, the gap may receive a bushing 413 and a spacer 414. The operation mechanism 40 further includes a catching member 43 which is moveably connected to the connecting member 41 by a pivot 42, and the pivot 42 extends through an aperture 412 which extends through the sides of the connecting member 41 and a first side of the catching member 43. Thus, the catching member 43 is pivotal in a (second) plane SP which crosses a longitudinal length of the pivot 42. Additionally, the catching member 43 is biased by an elastic element 432. The elastic element 432 is a torque spring and includes a first leg 4321 abutting against the catching member 43 and a second leg 4322 abutting against the spacer 414. Particularly, when the elastic element 432 is in a "rest" position, the elastic element 432 keeps the catching member 43 away from the first toothed member 32. Moreover, the catching member 43 includes a catching section 431 which is formed on its first side and is selectively engagable with the toothed section 322 of the first toothed member 32.

The operation mechanism 40 further includes a second pawl 44 moveably connected to the connecting member 41 by an axle 443, and an operation lever 45 moveably connected to the connecting member 41 through the catching member 43. The axle 443 extends through two second sides of the catching member 43 which are disposed oppositely, and a hole 445 of the second pawl 44 which extends in its longitudinal length. The operation lever 45 includes two lugs 451 formed on an end thereof and are spaced from each other oppositely. The second pawl 44 and the operation lever 45 are pivotal in a plane which crosses a longitudinal length of the axle 443. In addition, the second pawl 44 includes a first engaging section 441 and a second engaging section 442 which protrude radially outwardly from an outer periphery thereof, and the first and second engaging sections 441 and 442 extend in two different directions. Moreover, the second pawl 44 and the operation lever 45 are biased by elastic elements 444 and 453, respectively. The elastic element 444 is disposed between the operation lever 45 and the second pawl 44, and the elastic element 453 is disposed between the operation lever 45 and the catching member 43. Preferably, the elastic elements 444 and 453 are torque springs. The elastic element 444 includes a first leg 4441 abutted against the first engaging section 441 of the second pawl 44 and a second leg 4442 abutted against a stop wall 452 of the operation lever 45 which extends between the lugs 451, and the elastic element 453 includes a first leg 4531 abutted against the catching member 43 and a second leg 4532 abutted against the stop wall 452 of the operation lever 45.

Additionally, the first engaging section 441 of the second pawl 44 is adapted to selectively engage with the first plurality of teeth 3321 of the toothed section 332 formed on the second toothed member 33.

Further, the first pawl 24 includes a protrusion which includes a first surface 242 selectively depressible by the second engaging section 442 of the second pawl 44 to cause the engaging section 241 of the first pawl 24 to disengage from the second plurality of teeth 3322 of the second toothed member 33.

Figure 9:
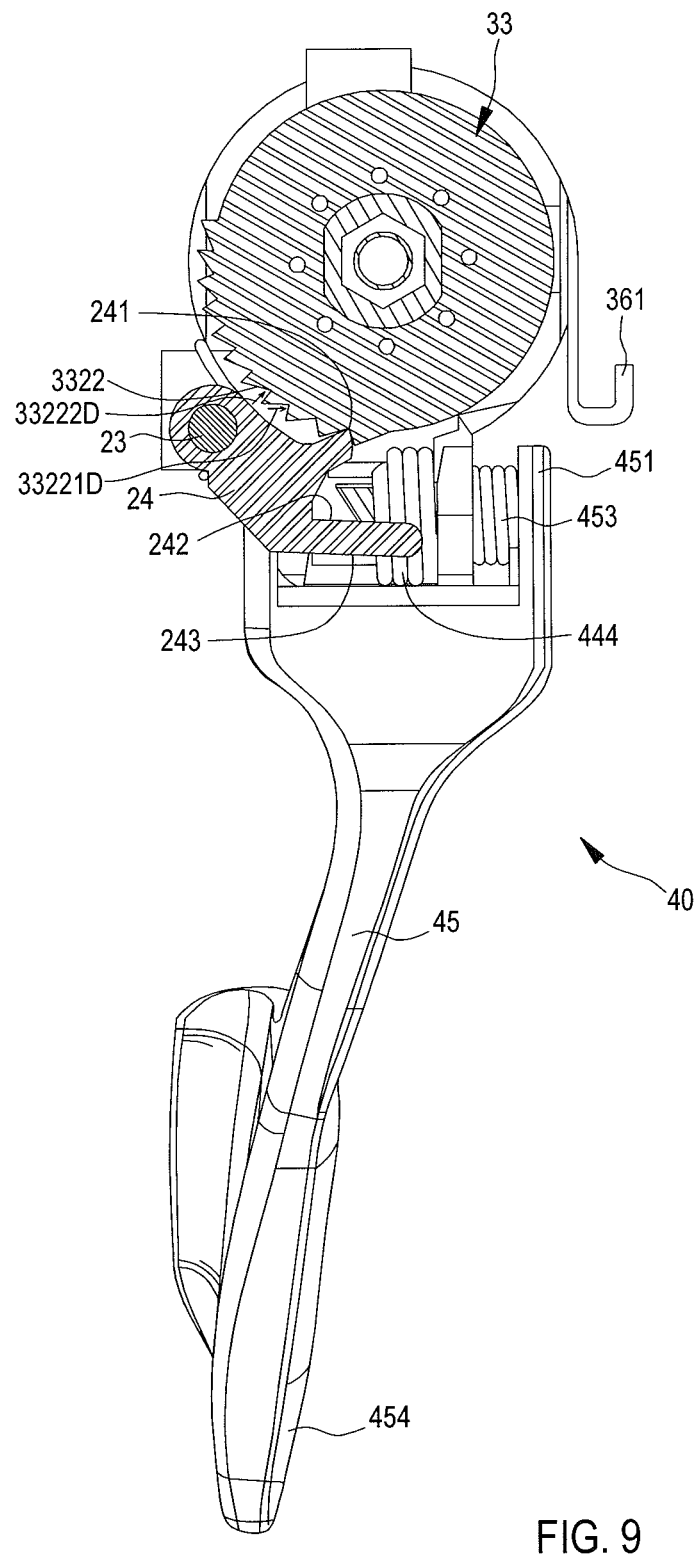
FIG. 9 is a cross-sectional view of the speed control device taken along line 9-9 of FIG. 2.
Figure 10:
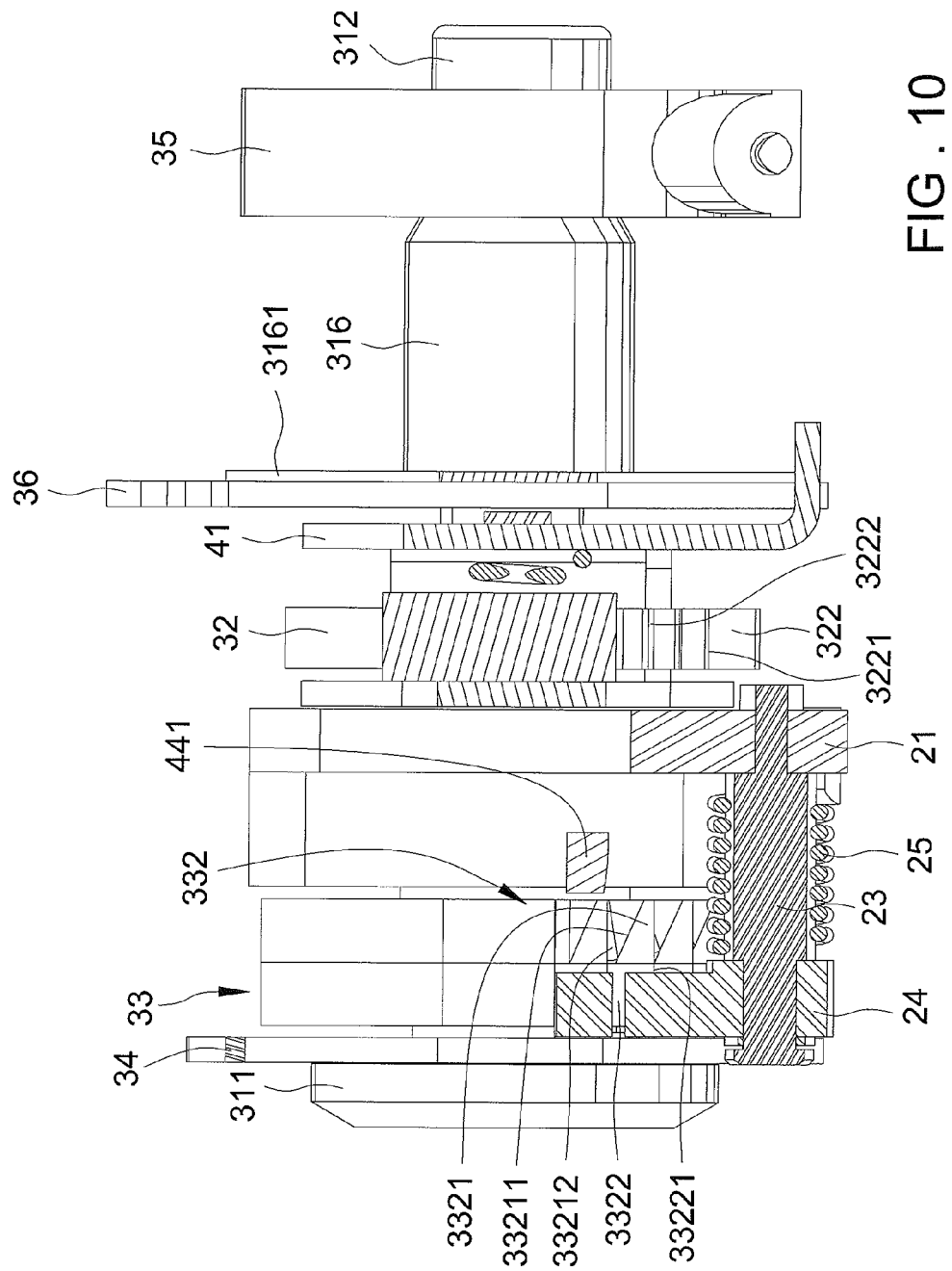
FIG. 10 is a cross-sectional view of the speed control device taken along line 10-10 of FIG. 3.
Figure 11:
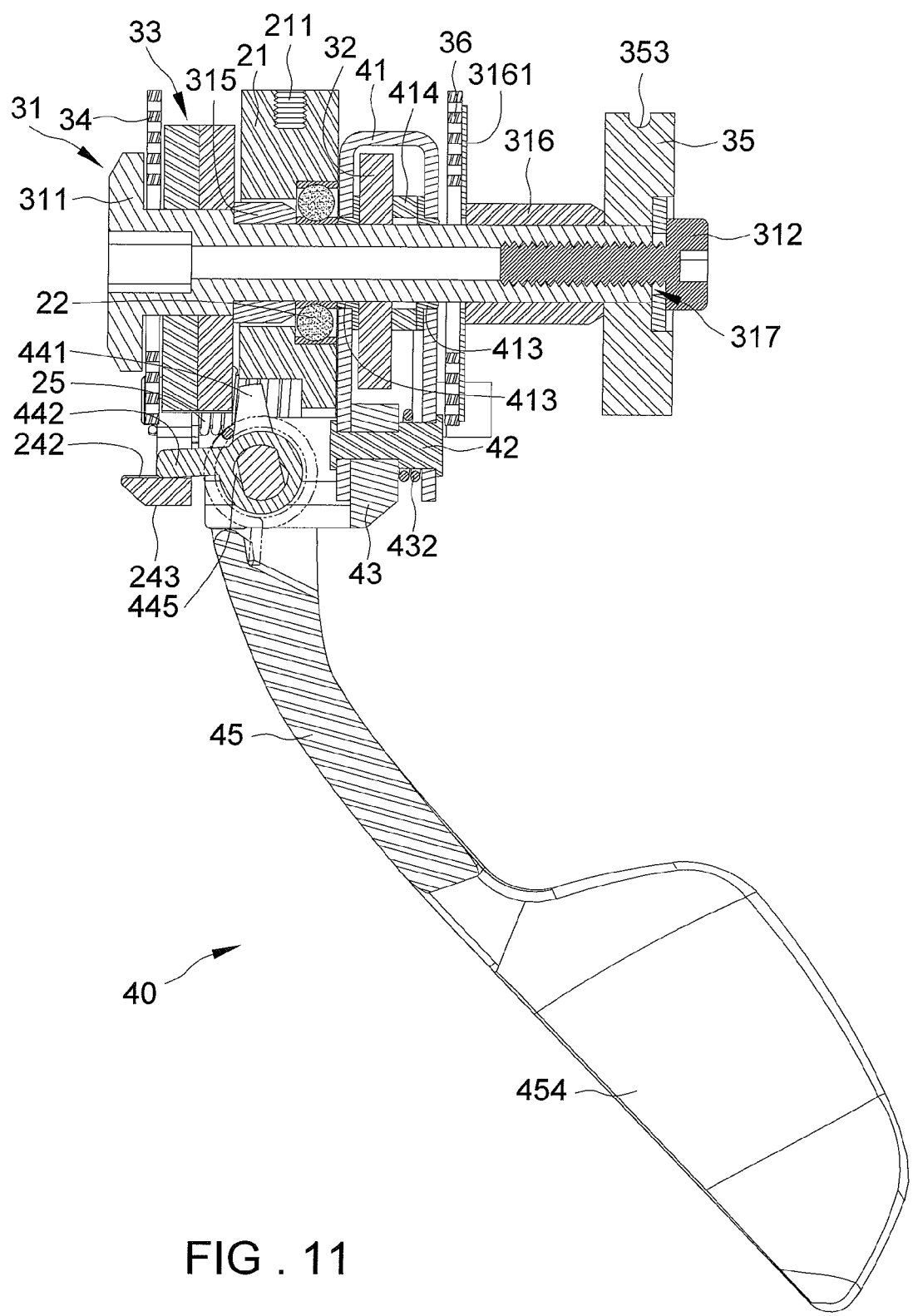
FIG. 11 is a cross-sectional view of the speed control device taken along line 11-11 of FIG. 3.
Figure 12:
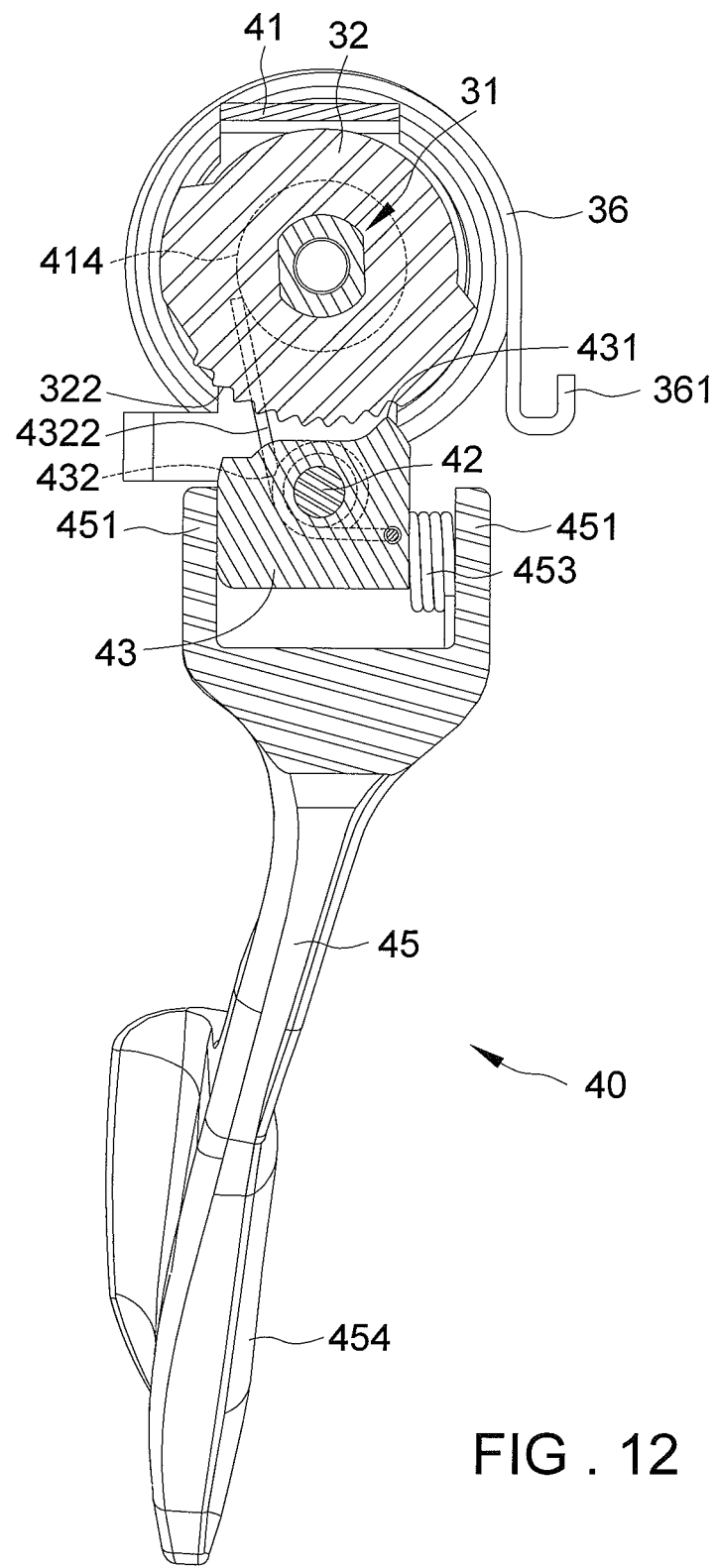
FIG. 12 is a cross-sectional view of the speed control device taken along line 12-12 of FIG. 2.
Figure 13:
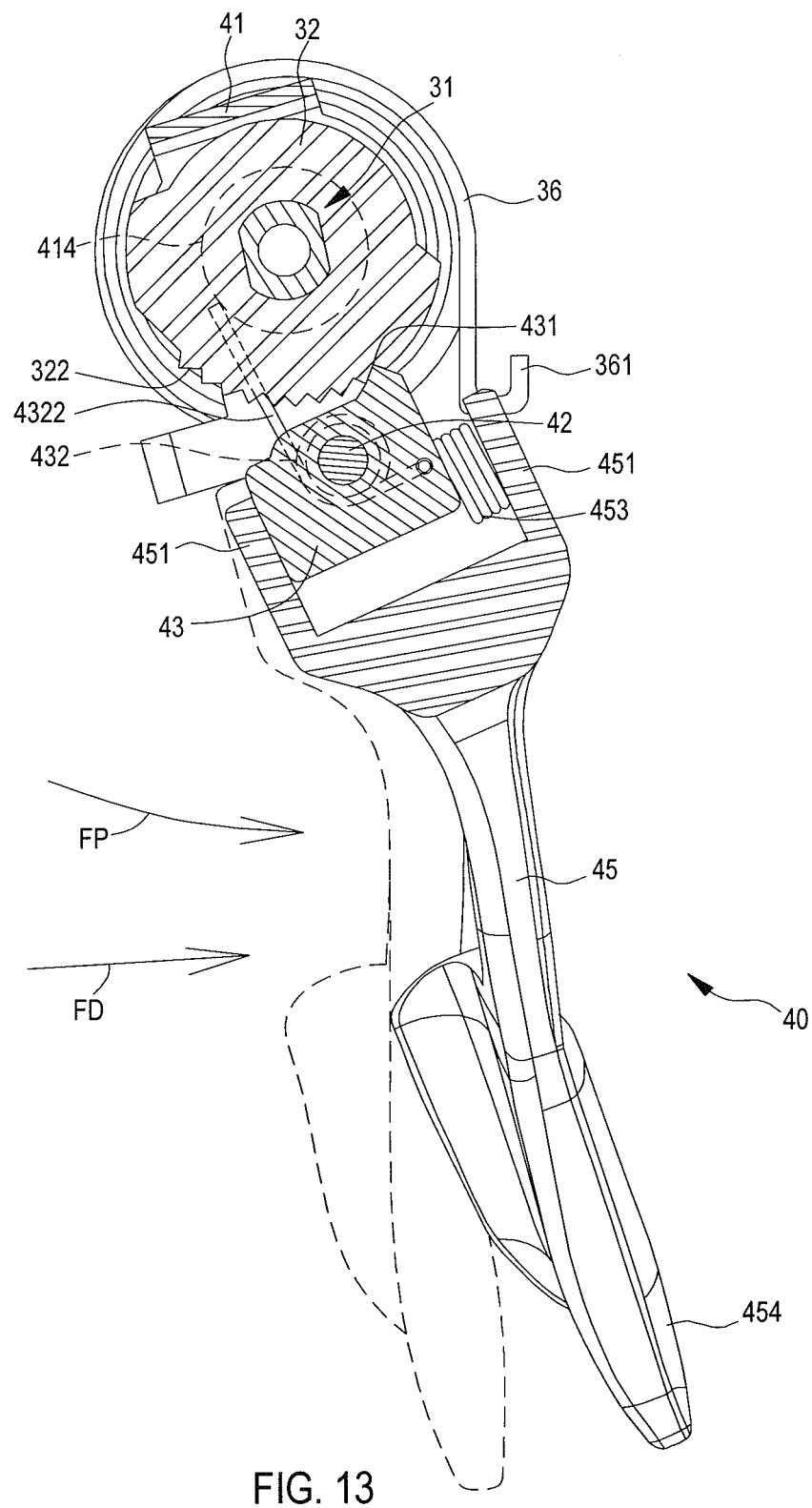
FIG. 13 is an extended view of FIG. 12 and shows an operation lever of the control assembly, with the operation lever pivoted in a first plane.
Figure 14:
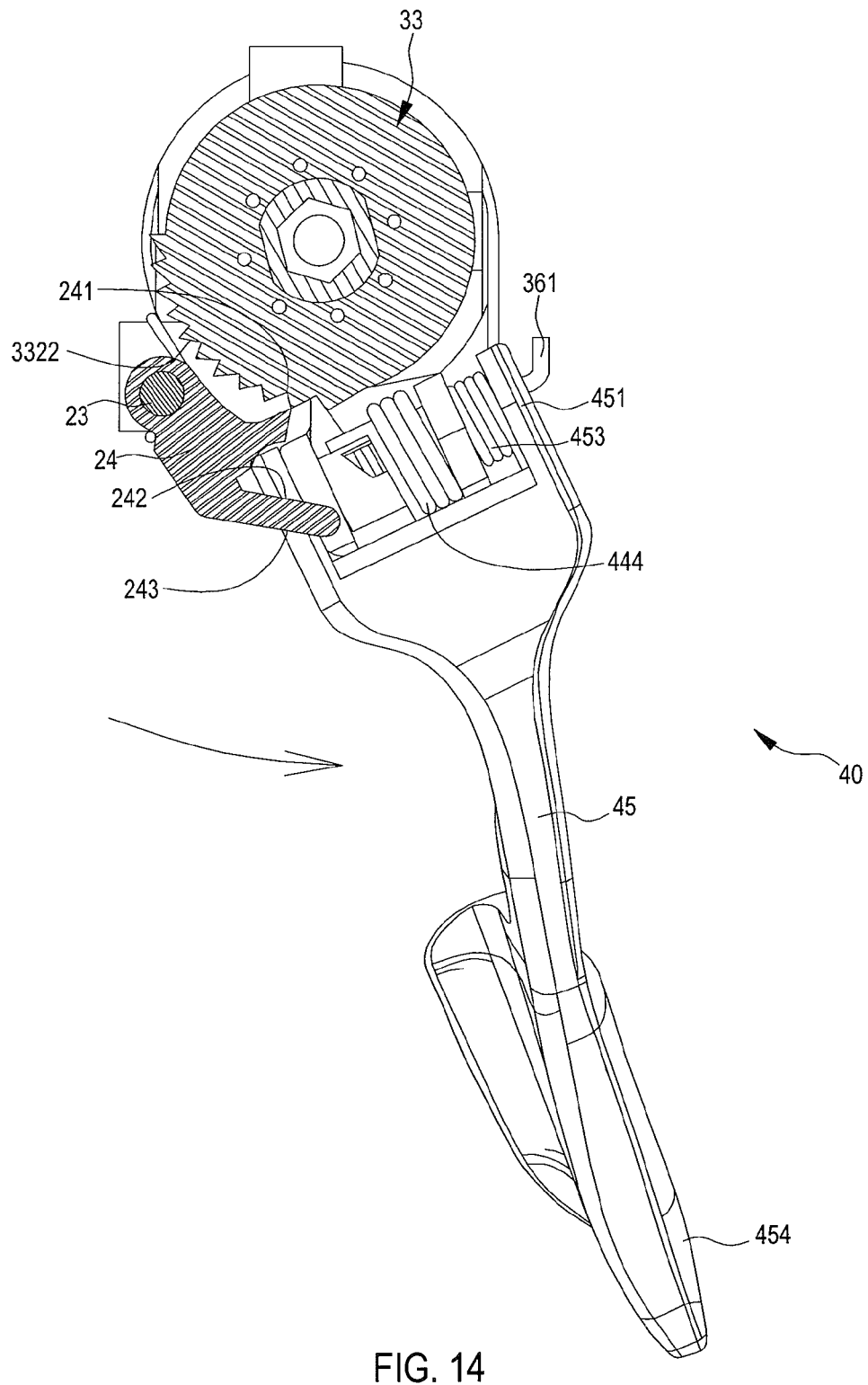
FIG. 14 is an extended view of FIG. 9 and shows the control assembly in a position corresponding to FIG. 13.
Figure 15:
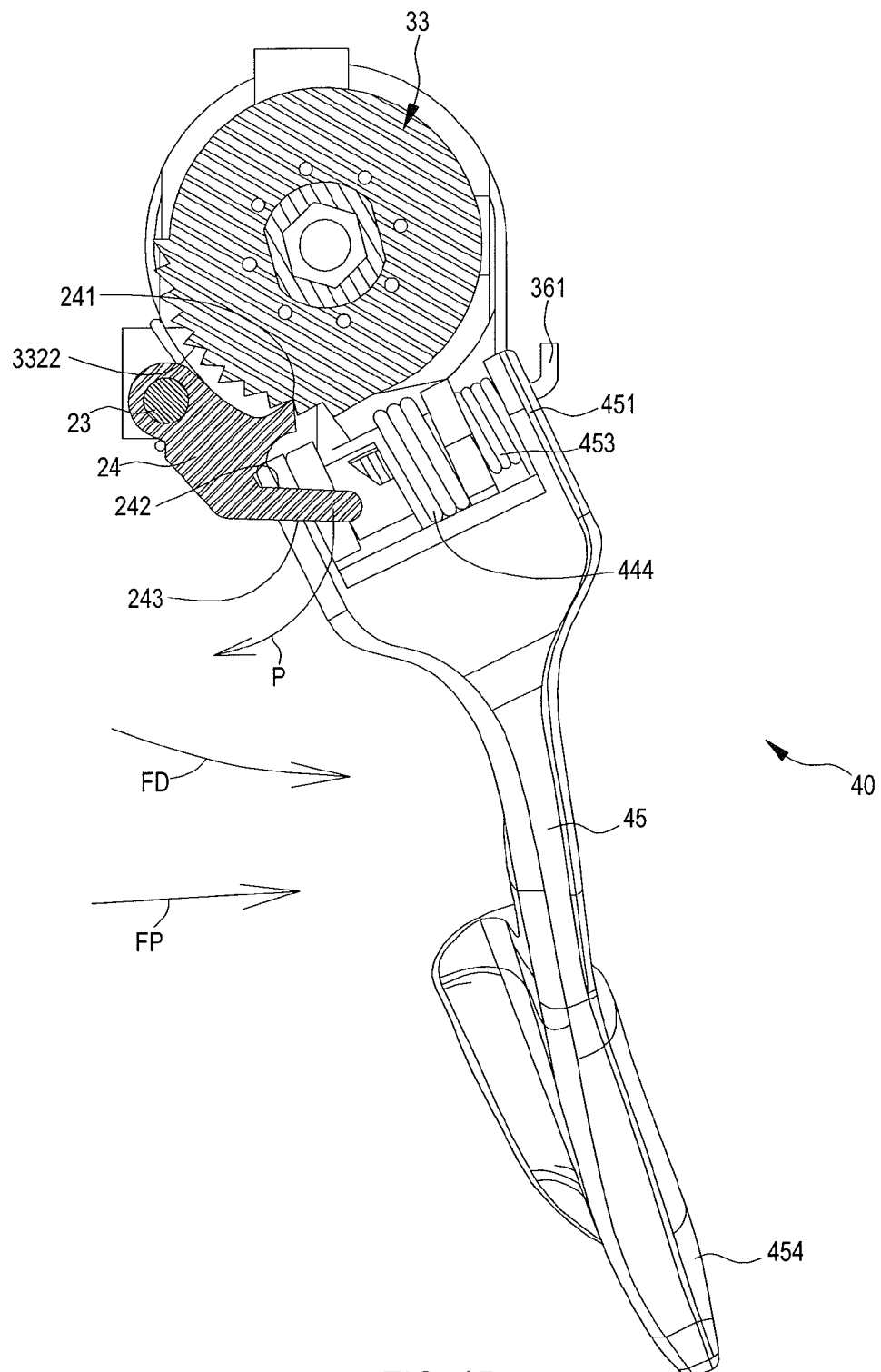
FIG. 15 is an extended view of FIG. 14 and shows the control assembly accomplishing one speed change.
Figure 16:
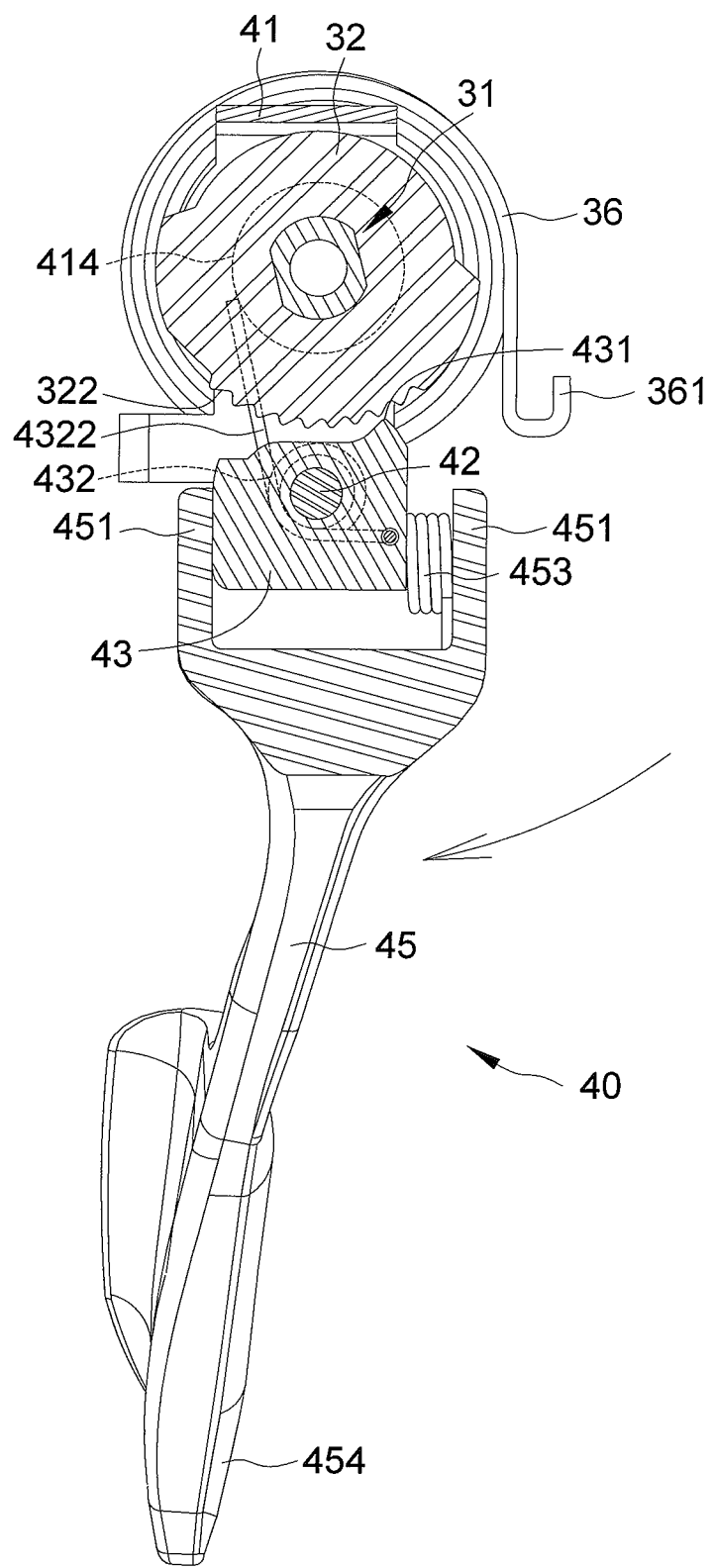
FIG. 16 is an extended view of FIG. 15 and shows the operation lever returned to its home position after accomplishing the speed change.
Figure 17:
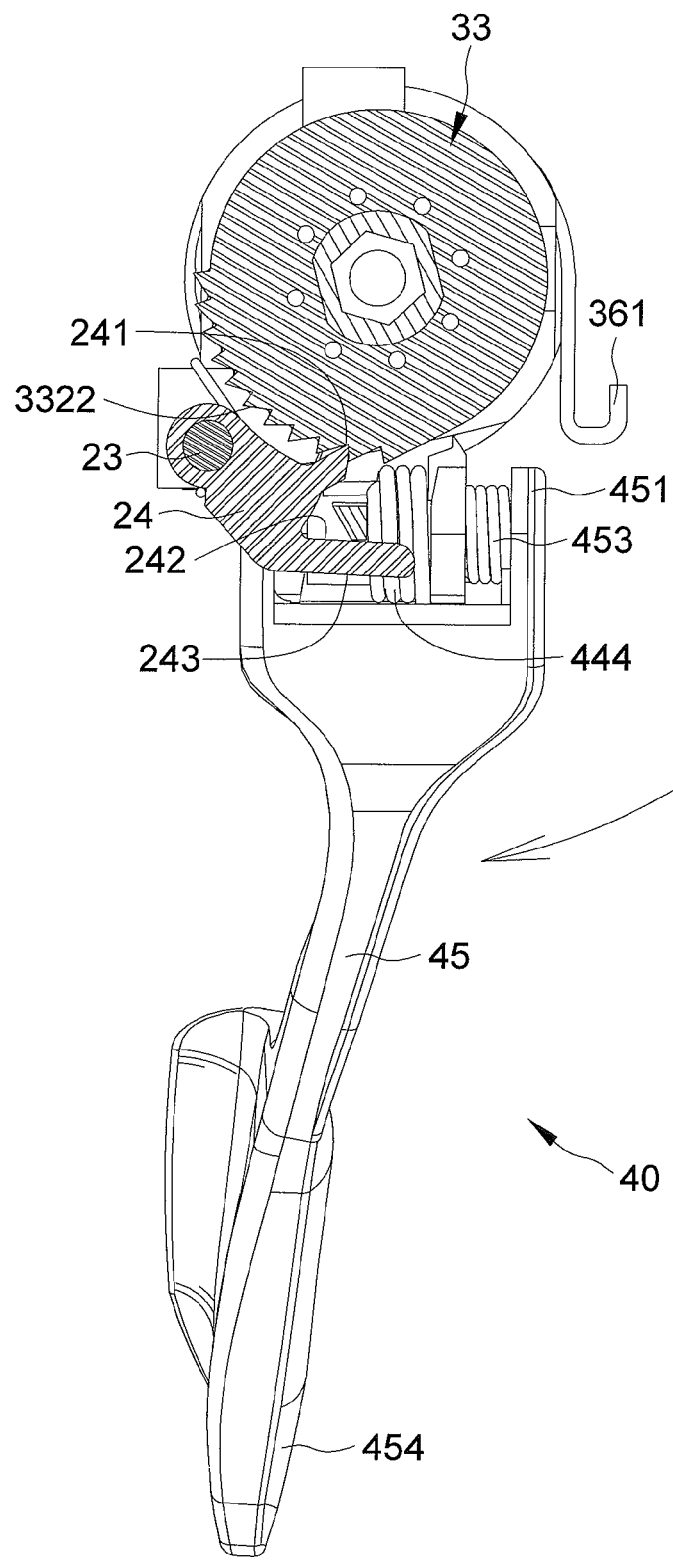
FIG. 17 is an extended view of FIG. 9 and shows the control assembly in a position corresponding to FIG. 16.
Figure 18:
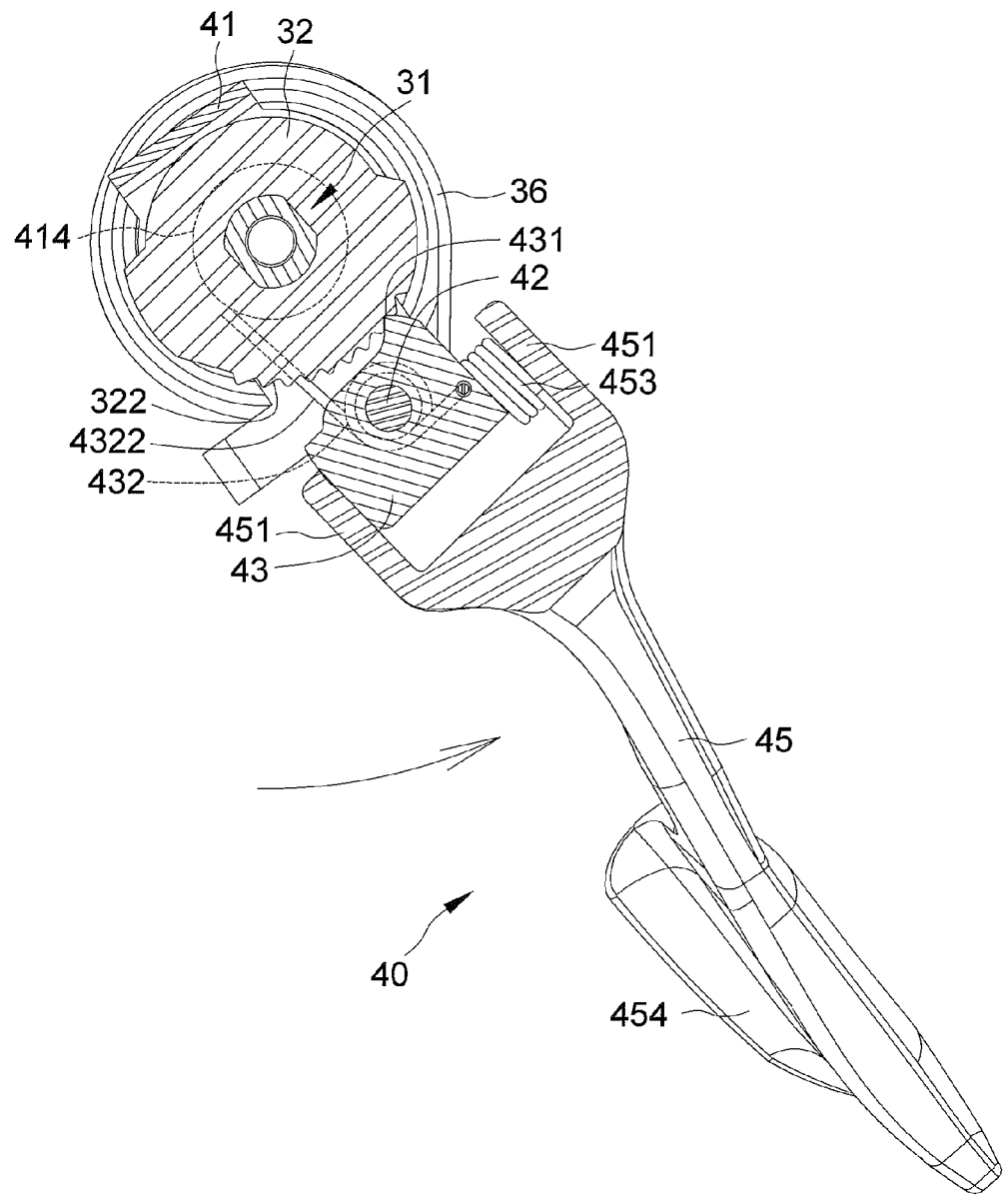
FIG. 18 is an extended view of FIG. 16 and shows the control assembly pivoted to commence another speed change.
Figure 19:
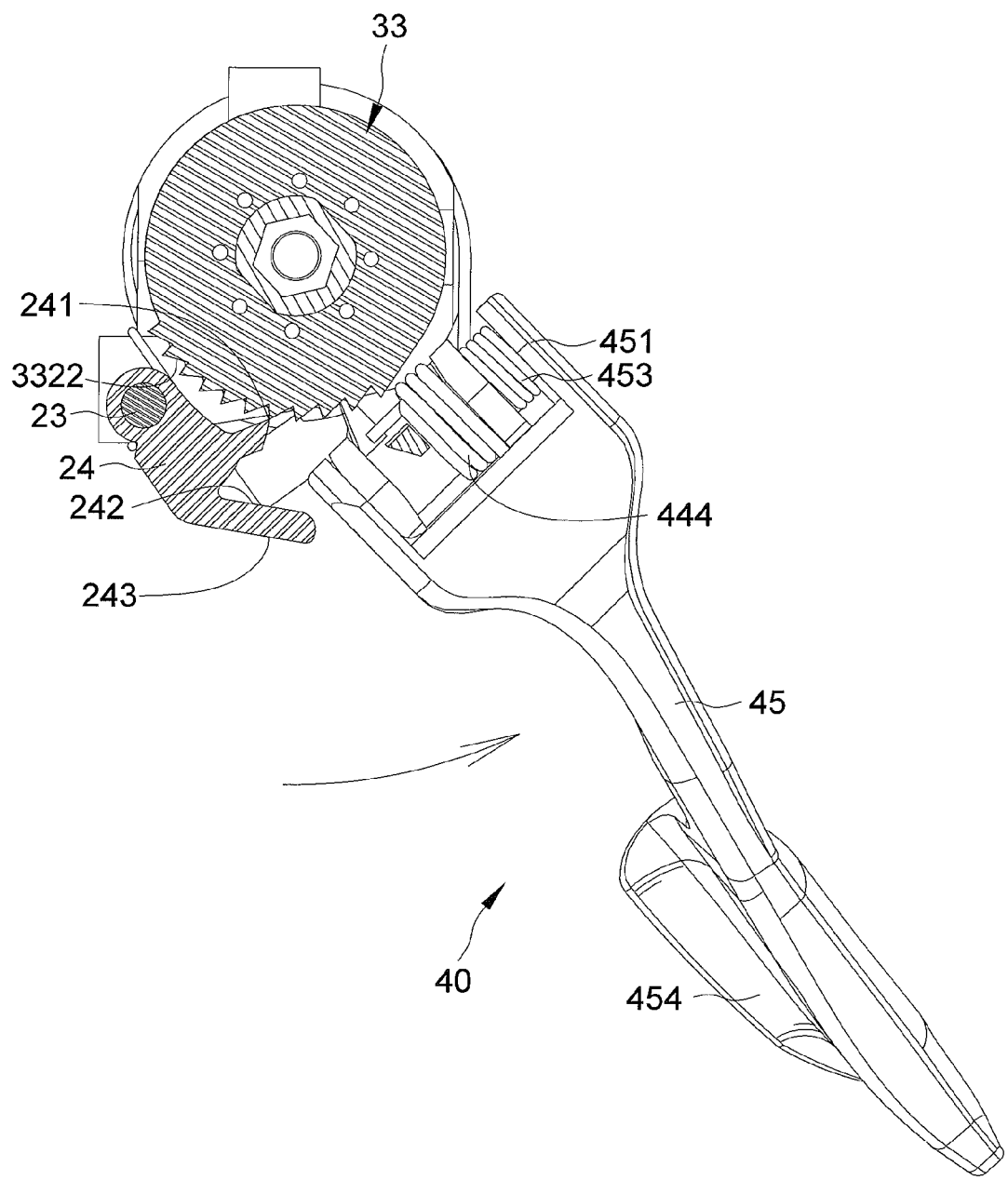
FIG. 19 is an extended view of FIG. 17 and shows the control assembly adapted to effect a multiple speed change in one stroke of the operation lever.
Figure 20:
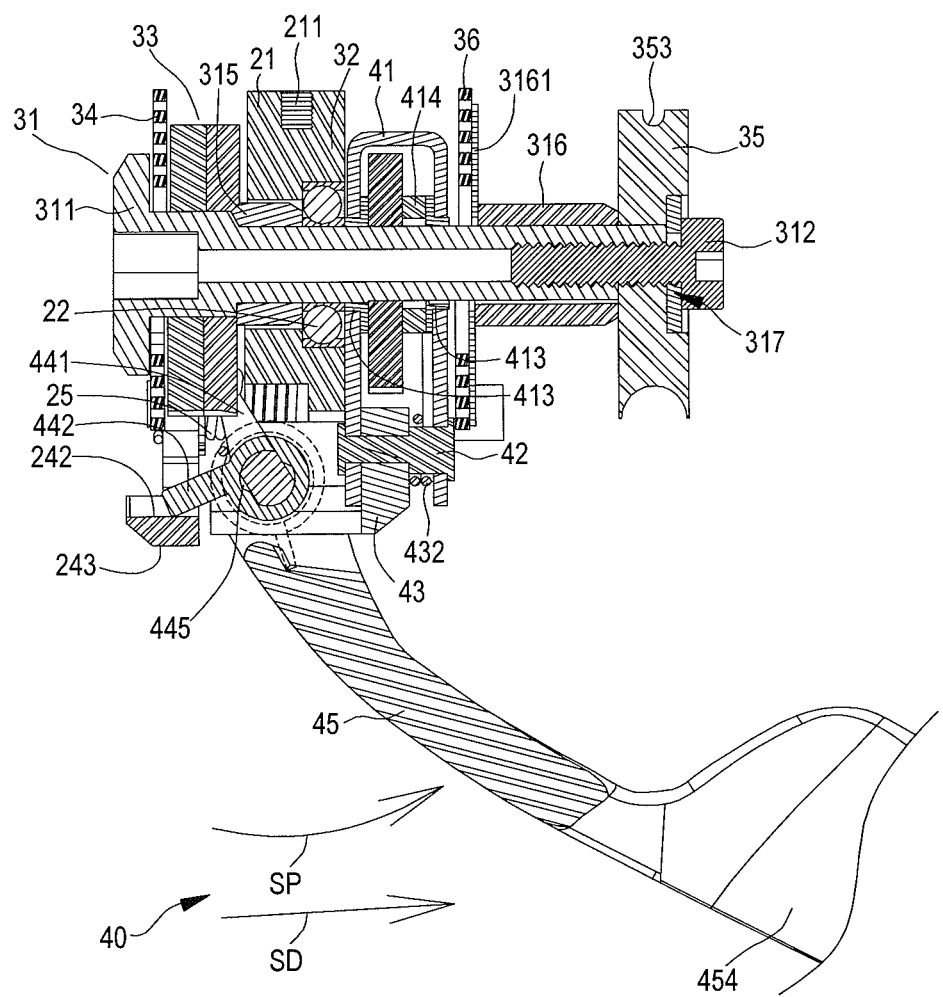
FIG. 20 is an extended view of FIG. 11 and shows the operation lever being pivoted in a second plane.
Figure 21:
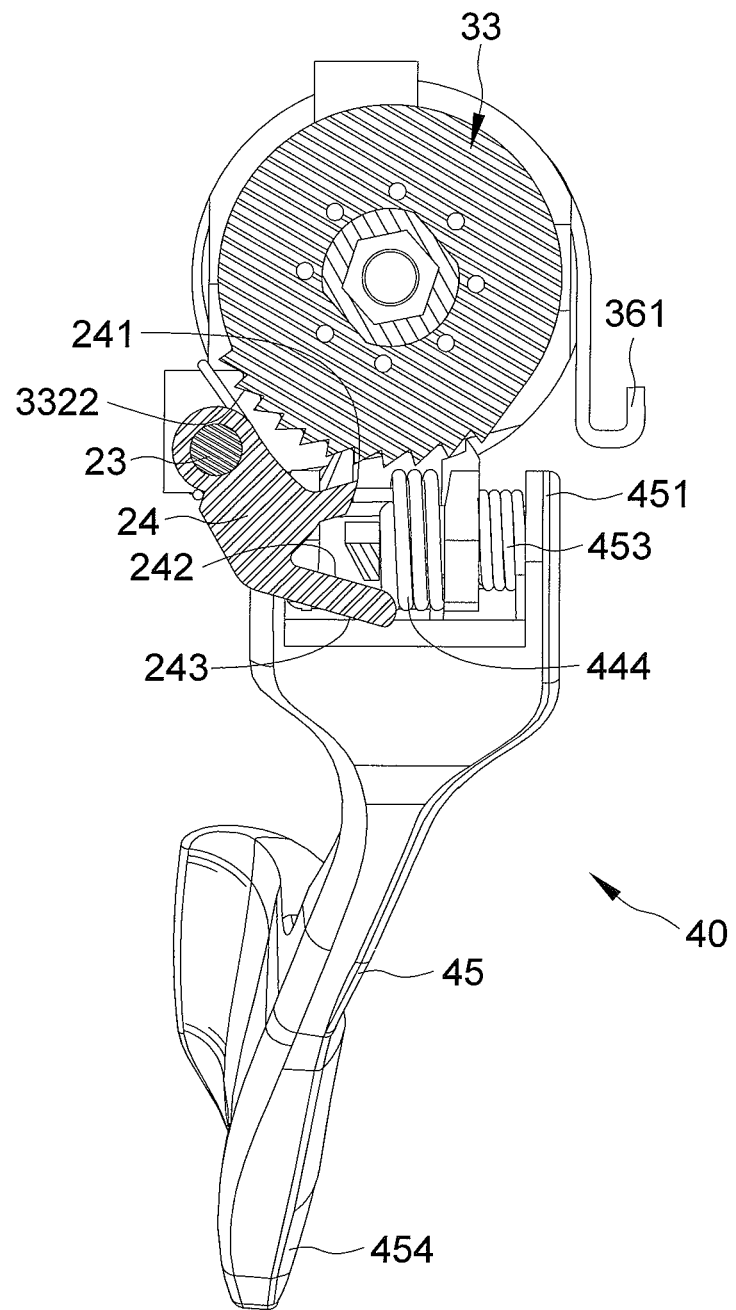
FIG. 21 is an extended view of FIG. 9 and shows the control assembly including a first toothed member and a first pawl disengaged from the first toothed member after the control assembly is pivoted in the second plane.

The speed control device has two operation modes. In one operation mode, i.e. the cable-winding operation as shown in FIGS. 10 through 15, the operation lever 45 is pivoted from its control end 454, but not necessarily, to pivot the catching section 431 of the catching member 43 to engage with the first toothed member 32 and then cause rotation of the first toothed member 32. As the first toothed member 32 is rotated, the second toothed member 33 is rotated concurrently. Then, the engaging section 241 of the first pawl 24 is shifted from a beginning position in which the engaging section 241 is engaged between a pair of teeth in the first toothed member 32 to a new position in which engaging section 241 is engaged with the next pair of teeth if one speed change is to be made. Next, the operation lever 45 is returned to its home position, i.e. an initial position where the operation lever 45 is positioned before commencing this cable-winding operation (as shown in FIG. 9). Additionally, FIG. 19 shows the control assembly 2 is adapted to effect a multiple speed change in one stroke of the operation lever 45.

Figure 22:
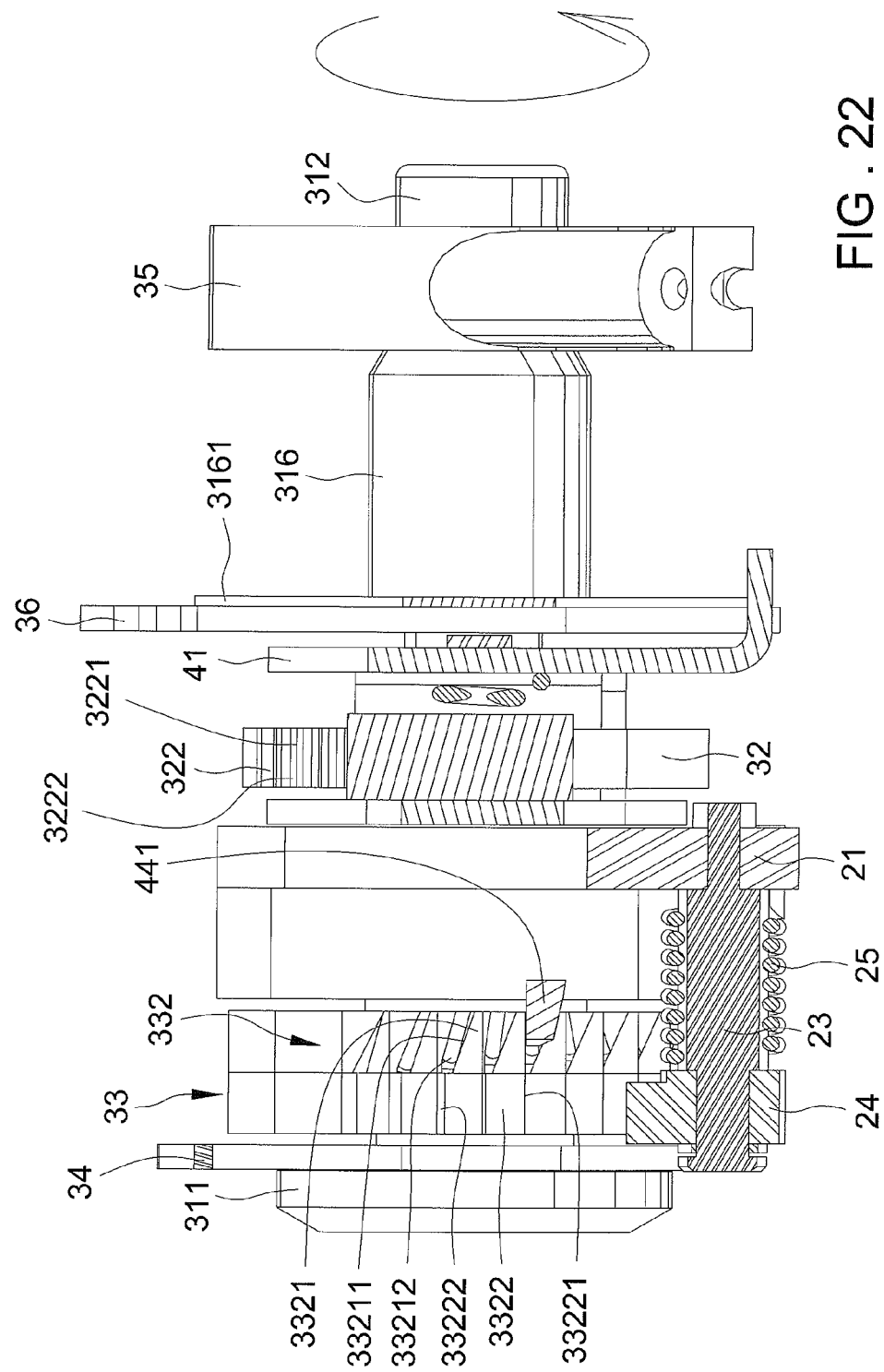
FIG. 22 is a cross-sectional view showing the control assembly including a second toothed member and a second pawl engaged with the second toothed member upon the disengagement of the first pawl from the first toothed member.
Figure 23:
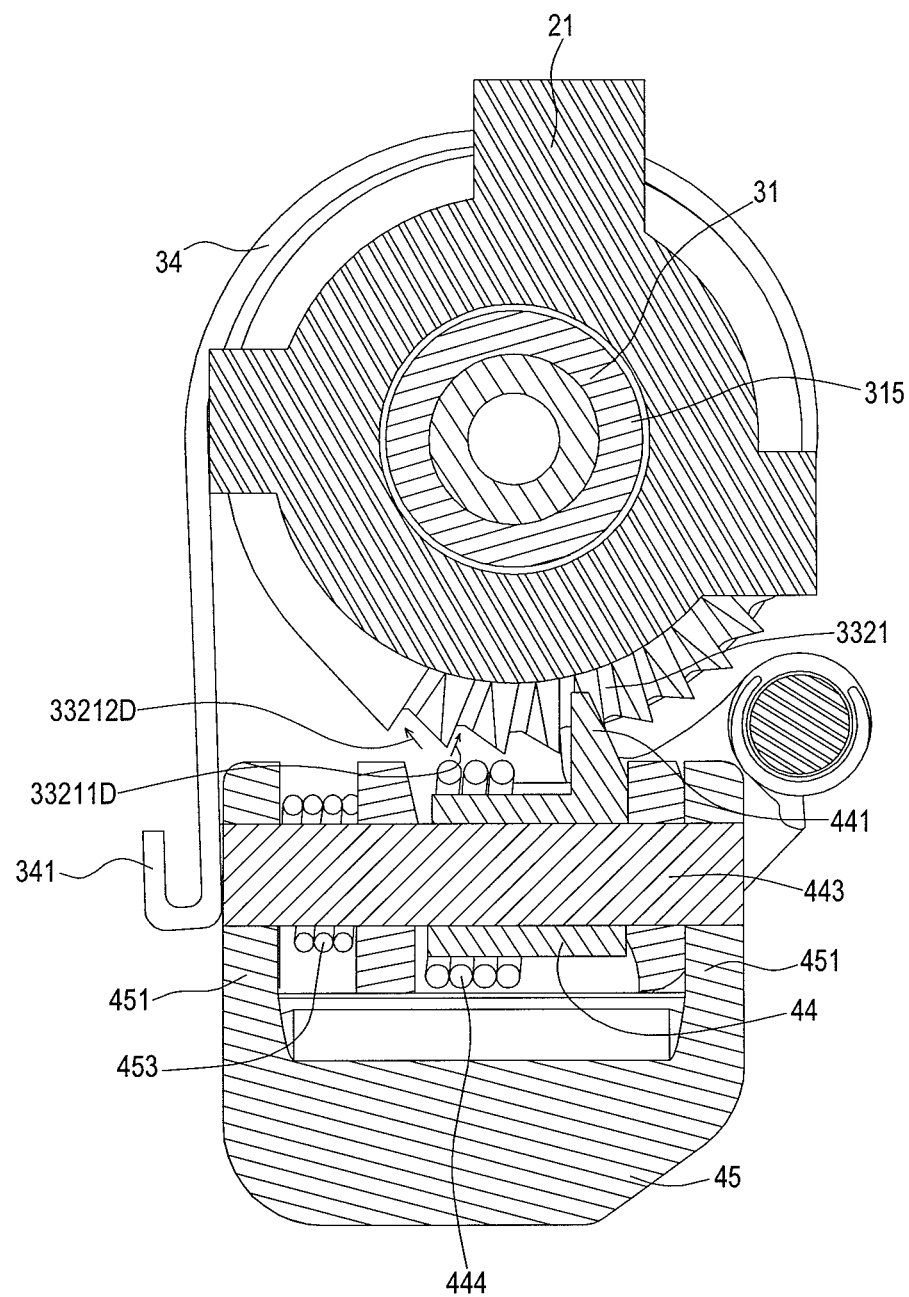
FIG. 23 is a cross-sectional view showing the first pawl engaged with the first toothed member and the second pawl disengaged from the second toothed member upon return of the operation lever to its home position.

In another operation mode, i.e. the cable-releasing operation, as shown in FIGS. 20 through 23, the operation lever 45 is pivoted in a plane P which crosses that for the cable-winding operation and is then released to accomplish the cable-releasing. When the operation lever 45 is pivoted from an initial position where the operation lever 45 is positioned before commencing this cable-releasing operation, the second pawl 44 is pivoted in one direction. The first engaging section 441 can engage in the first plurality of teeth 3321 of the toothed section 332 formed on the second toothed member 33, and the second engaging section 442 of the second pawl 44 can depress the first surface 242 of the protrusion of the first pawl 24 to disengage the first pawl 24 from the second plurality of teeth 3322 of the toothed section 332 formed on the second toothed member 33. The first engaging section 441 of the second pawl 44 is engaged in the first plurality of teeth 3321 of the second toothed member 33 before the first pawl 24 is disengaged from the current pair of teeth. In this case, the second toothed member 33 rotates in a direction (as shown in FIG. 22) reverse to a direction occurring during the cable-winding operation. Additionally, the engagement of the first engaging section 441 in the first plurality of teeth 3321 of the toothed section 332 formed on the second toothed member 33 has the function to limit the rotation of the second toothed member 33. Hence, the complete assembly of the connecting shaft 31, the first and second toothed members and the cable receiving member occurs in a single step.

When the operation lever 45 is released to return to the initial position where the operation lever 45 is positioned before commencing this cable-releasing operation, the second pawl 44 is pivoted in another direction, and the second engaging section 442 of the second pawl 44 is disengaged from the first surface 242 of the protrusion of the first pawl 24. As the second engaging section 442 of the second pawl 44 is disengaged from the first surface 242 of the protrusion of the first pawl 24, the first engaging section 441 of the second pawl 44 is disengaged from the first plurality of teeth 3321 of the toothed section 332 formed on the second toothed member 33, and the first pawl 24 is engaged with the second plurality of teeth 3322 of the toothed section 332 formed on the second toothed member 33 afterwards.

In addition, it is an aspect of the present invention that the operation lever 45 will not cause a speed change despite being depressed by the brake assembly 3, as shown in FIGS. 24 through 27. The brake assembly 3 includes a brake lever 51 pivotally connected to the housing 1, a shift lock 52 pivotally connected to the brake lever 51 by an axle 511, and an elastic element 53. The elastic element 53 is a torque spring and includes a coiled section inserted by the axle 511, a first leg 531 abutted against the brake lever 51 and a second leg 532 abutted against the shift lock 52. The brake lever 51 includes a stop wall 512 and a control end 513 at an end thereof such that the control end 513 can be operated to pivot the brake lever 51, but not necessarily. The shift lock 52 includes a proximal end 521 adjacent to the first pawl 24 and is adapted to selectively abut against a second surface 243 of the protrusion of the first pawl 24, and a distal end 522 adapted to selectively abut against the stop wall 512 of the brake lever 51. Additionally, the second surface 243 is a surface on the protrusion which is opposite to the first surface 242.

Figure 24:
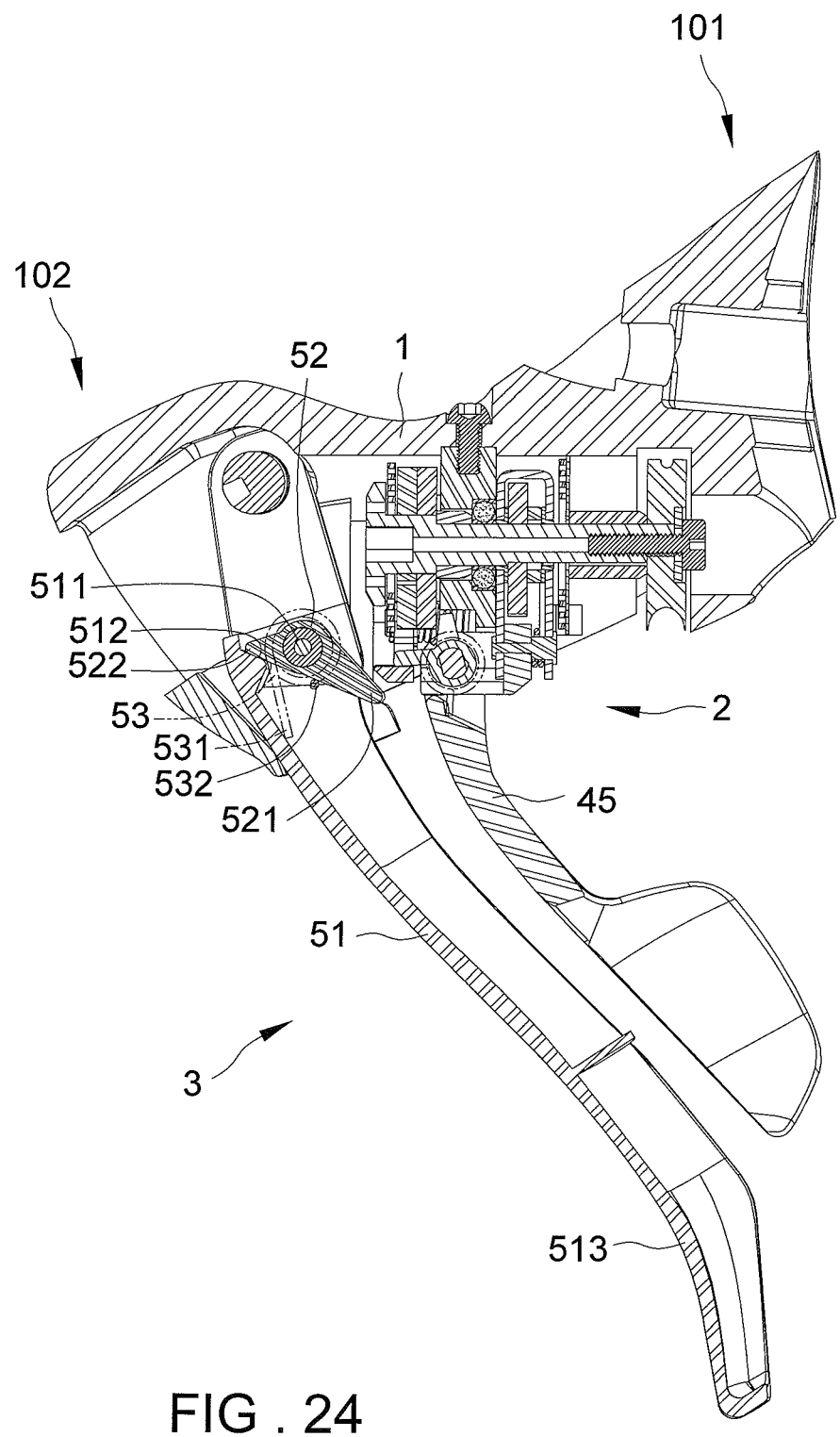
FIG. 24 is a cross-sectional view of the speed control device taken along line 24-24 of FIG. 1.
Figure 25:
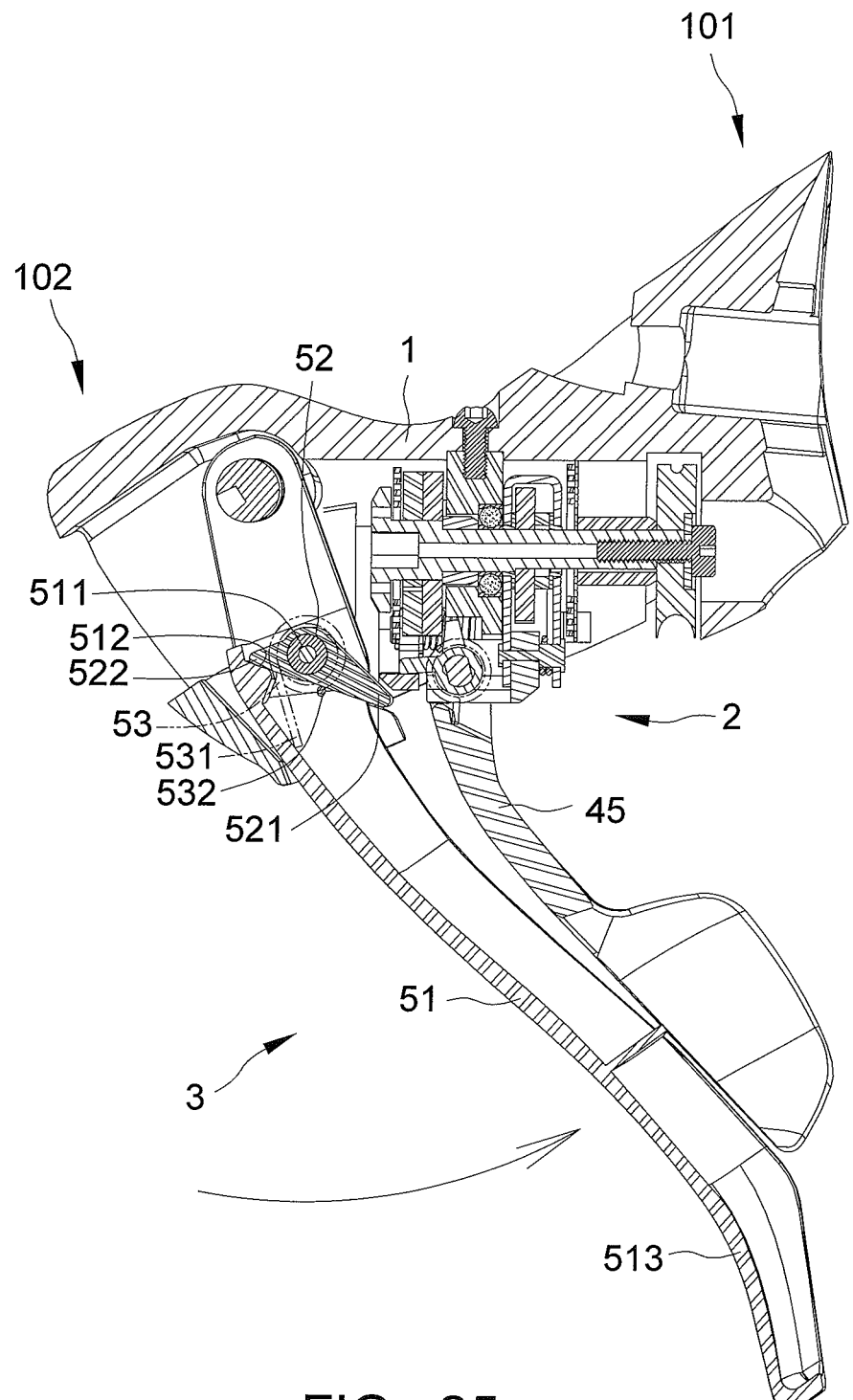
FIG. 25 is an extended view of FIG. 24 and shows the operation of a brake assembly embodying the present invention.
Figure 26:
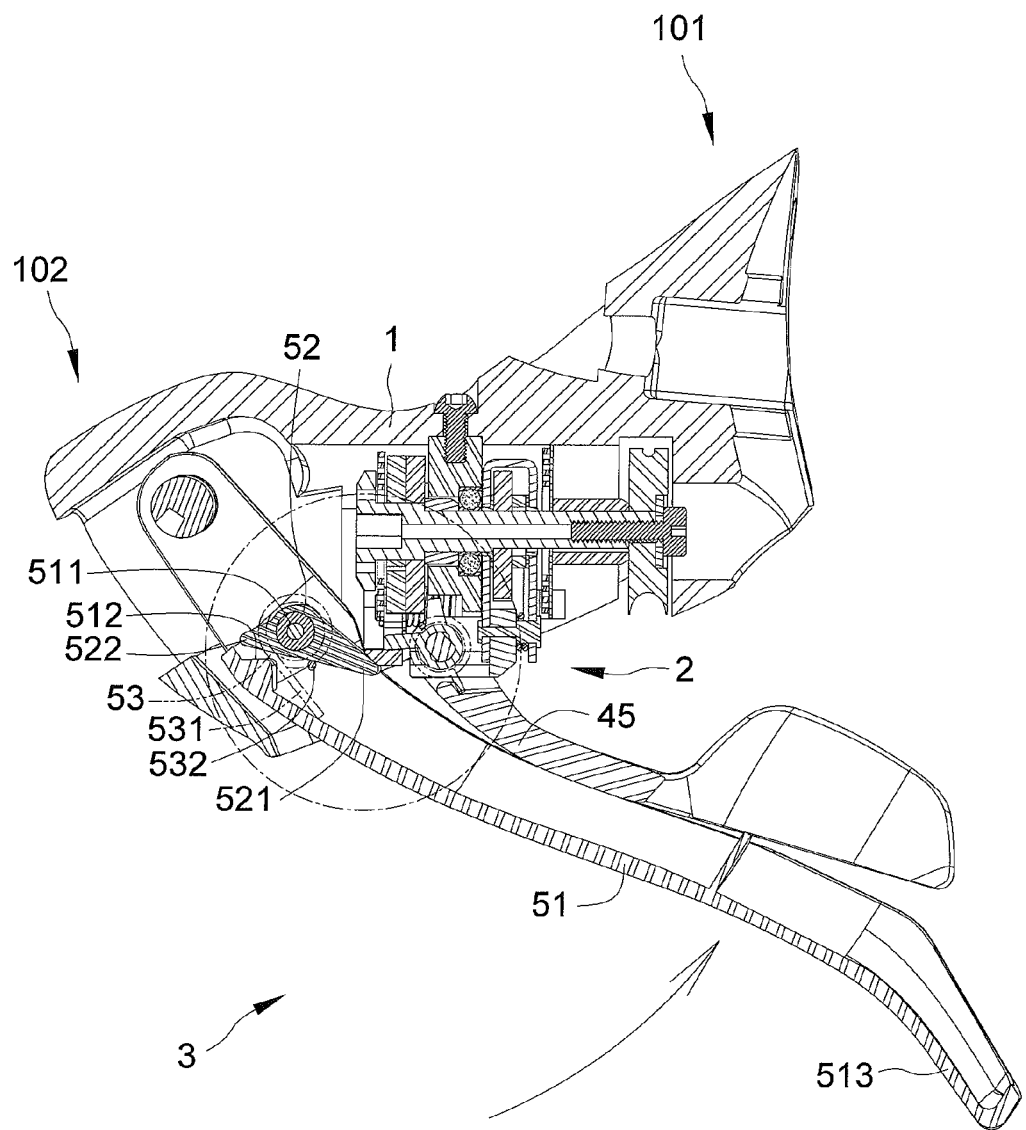
FIG. 26 is an extended view of FIG. 25 and shows the operation lever of the control assembly will not cause a speed change, despite being depressed by the brake assembly.
Figure 27:
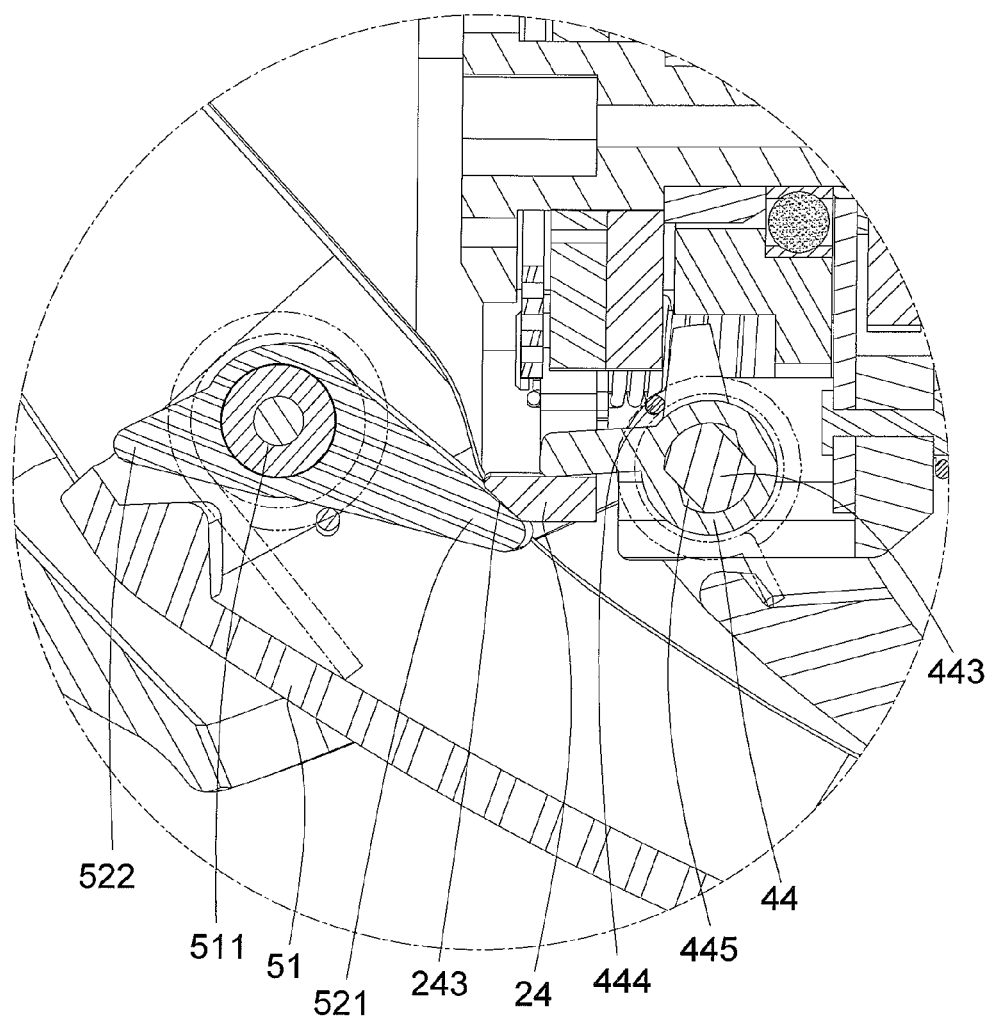
FIG. 27 is a partial, enlarged view of FIG. 24.

Further, it is another aspect of the present invention that the axle 443 is pivoted from a first position through an angle to a second position despite the second pawl 44 being restrained by the shift lock 52. Accordingly, the axle 443 has two opposing straight sides, and the hole 445 of the second pawl 44 has a cross section in a shape of a "8". The axle 443 has upper right and lower left sections (as shown in FIG. 24) engaged with a wall delimiting the hole 445 when the shift lock 52 does not abut against the second surface 243 of the protrusion of the first pawl 24, i.e. the first position, and has upper left and lower right sections (as shown in FIG. 26) engaged with the wall of the hole 445 when the shift lock 52 abuts against the second surface 243 of the protrusion of first pawl 24, i.e. the second position. Therefore, this allows the speed control device to have a range in which the operation lever 45 can rotate without having the cable released as set forth in the aforementioned context that is related to the cable-release operation, since the shift lock 52 abuts against the surface 243.

While the specific embodiments have been illustrated and described, numerous modifications come to mind without significantly departing from the spirit of invention, and the scope of invention is only limited by the scope of the accompanying claims.

What is claimed is:

1. A speed control device operable between a cable-winding operation mode and a cable-releasing operation mode, comprising:
a control assembly including a first toothed member and a second toothed member borne on a connecting shaft, with the first and second toothed members rotatable together about a pivot in first and second directions;
an operation lever pivotal in a first plane to rotate the first and second toothed members in the first direction for up-shifting speed, and with the operation lever pivotal in a second plane to rotate the first and second toothed members in the second direction for down-shifting the speed, with the first plane not being parallel to the second plane;
a first pawl selectively engaged between adjacent teeth of a second plurality of teeth formed on the second toothed member;
a catching member selectively engaged between first adjacent teeth of a first plurality of teeth of a toothed section formed on the first toothed member; and
a second pawl including a first engaging section selectively engaged between second adjacent teeth of the first plurality of teeth of the toothed section and a second engaging section selectively engaged with the first pawl to urge the first pawl away from the first toothed member.

2. The speed control device as claimed in claim 1 wherein the first plane crosses the second plane.

3. The speed control device as claimed in claim 1 wherein the catching member pivots in one plane and the second pawl pivots in another plane which crosses the one plane of the catching member.

4. The speed control device as claimed in claim 1 wherein the second pawl and the operation lever are biased by first and second elastic elements, respectively, wherein the first elastic element includes a first leg abutted against the first engaging section of the second pawl and a second leg abutted against the operation lever, and wherein the second elastic element includes a first leg abutted against the catching member and a second leg abutted against the operation lever.

5. The speed control device as claimed in claim 4 wherein the operation lever is adapted to return to a home position in which the operation of the speed control device is not yet commenced under the effect of the first and second elastic elements.

6. The speed control device as claimed in claim 1 wherein the first and second adjacent teeth of the first plurality of teeth each have an interconnecting edge which extends in a first direction, wherein each tooth of the first and second adjacent teeth has a ridge which extends in a second direction different than the first direction, with the first direction of the interconnecting edge having an angled relationship with respect to the second direction of the ridge, wherein the adjacent teeth of the plurality of teeth formed on the second toothed member have an interconnecting edge which extends in a third direction, and wherein each tooth of the plurality of the teeth of the second toothed member has a ridge which extends in a fourth direction different than the third direction, with the third direction of the interconnecting edge extending parallel to the fourth direction of the ridge.

7. The speed control device as claimed in claim 1 further comprising a housing pivotally receiving the control assembly a fixing member connected to the housing and, a pivot mounted to the fixing member, and wherein the first pawl is inserted by the pivot and connected to the fixing member and is pivotal in a plane which crosses a longitudinal length of the pivot.

8. The speed control device as claimed in claim 7 wherein the first pawl is biased by an elastic element, wherein the elastic element includes a plurality of coaxially disposed coiled sections inserted by the pivot and a first leg extending therefrom and connecting to the first pawl and a second leg extending therefrom and connecting to the fixing member.

9. The speed control device as claimed in claim 7 wherein the connecting shaft inserts through the fixing member.

10. The speed control device as claimed in claim 9 further comprising an elastic element including a proximal end hooked to the housing and a distal end, wherein the connecting shaft includes a first engaging peripheral section on which the fixing member is borne and a second engaging peripheral section on which the first and second pawls are borne, and wherein the distal end of the elastic element is hooked to the connecting shaft.

11. The speed control device as claimed in claim 10 wherein the first engaging peripheral section has a circular cross-section and the second engaging peripheral section has a non-circular cross section.

12. The speed control device as claimed in claim 7 wherein the first pawl includes an engaging section selectively engaged between the adjacent teeth of the plurality of teeth of the second toothed member and a protrusion including a first surface selectively depressed by the second engaging section of the second pawl.

13. The speed control device as claimed in claim 12 further comprising a brake assembly pivotally connecting to the housing, with the brake assembly including a brake lever pivotally connected to the housing, a shift lock pivotally connected to the brake lever, and an elastic element, wherein the brake lever includes a stop wall, wherein the shift lock includes a proximal end adjacent to the first pawl and selectively abutting against a second surface of the protrusion of the first pawl, and wherein the shift lock includes a distal end selectively abutting against the brake lever.

14. The speed control device as claimed in claim 13 wherein the second pawl is connected to the catching member by an axle, wherein the second pawl includes a hole through which the axle is inserted, wherein the axle has two opposite straight sides, wherein the hole of the second pawl has a cross section in a shape of a "8", and wherein the axle has upper right and lower left sections engaged with a wall delimiting the hole when the first pawl is remote from the second surface of the protrusion of the first pawl and has upper left and lower right sections engaged with the wall of the hole when the first pawl abuts against the second surface of the protrusion of the first pawl.

15. The speed control device as claimed in claim 1 further comprising a cable-receiving member mounted on the connecting shaft, with the cable-receiving member receiving a shifting cable utilized to effect speed change upon operation of the speed control device.

* * * * *